US012711204B2

(12) United States Patent
Blair

(10) Patent No.: US 12,711,204 B2
(45) Date of Patent: Aug. 18, 2026

(54) ARTWORK REMOTE AUTHENTICATION SYSTEM

(71) Applicant: Preston Blair, New York, NY (US)

(72) Inventor: Preston Blair, New York, NY (US)

( * ) Notice: Subject to any disclaimer, the term of this patent is extended or adjusted under 35 U.S.C. 154(b) by 0 days.

(21) Appl. No.: 18/812,609

(22) PCT Filed: Dec. 1, 2023

(86) PCT No.: PCT/US2023/082056
§ 371 (c)(1),
(2) Date: Aug. 22, 2024

(87) PCT Pub. No.: WO2024/119063
PCT Pub. Date: Jun. 6, 2024

(65) Prior Publication Data

US 2025/0348560 A1 Nov. 13, 2025

Related U.S. Application Data

(60) Provisional application No. 63/582,194, filed on Sep. 12, 2023, provisional application No. 63/385,743, filed on Dec. 1, 2022.

(51) Int. Cl.
*G06F 21/10* (2013.01)
*G06F 21/60* (2013.01)

(52) U.S. Cl.
CPC .......... *G06F 21/106* (2023.08); *G06F 21/602* (2013.01)

(58) Field of Classification Search
CPC ............................ G06F 21/106; G06F 21/602
See application file for complete search history.

(56) References Cited

U.S. PATENT DOCUMENTS 10,210,527 B2 2/2019 Radocchia et al.
10,290,036 B1 * 5/2019 Gella ................ G06Q 30/0623
(Continued)

FOREIGN PATENT DOCUMENTS

CN 116308688 A 6/2023
JP 2023000072 A 1/2023
(Continued)

OTHER PUBLICATIONS

Wei-Shan Lee et al., SPChain: A Smart and Private Blockchain-ENabled Framework for Combining GDPR-Compliant Digital Assets Management With AI Models, Dec. 2022, pp. 1-20. (Year: 2022).*
(Continued)

*Primary Examiner* — Luu T Pham
*Assistant Examiner* — Canh Le
(74) *Attorney, Agent, or Firm* — Thompson Patent Law Offices PC

(57) ABSTRACT

Apparatus and associated methods relate to an artwork authenticity owner validation system. In an illustrative example, an artwork remote identification system (ARIS) may include an artwork companion chip (ACC) and a certificate of authenticity (COA). The ACC, for example, may be physically attached to an artwork. The ACC and the COA, for example, may each include a unique identifier. For example, a centralized server may be configured to automatically authenticate an ownership of the artwork attached to the ACC by validating the ACC and the COA. For example, the user may scan the COA and then the ACC within a predetermined time limit to gain access to modify an ownership record in an artwork profile of the artwork. Various embodiments may advantageously allow a modification to the ownership information only when the centralized authentication server validates the COA and the ACC within the predetermined time period.

21 Claims, 15 Drawing Sheets

(56) References Cited

U.S. PATENT DOCUMENTS

| | | | |
|---|---|---|---|
| 10,936,834 | B2 | 3/2021 | Chang |
| 11,107,088 | B2 | 8/2021 | Radocchia et al. |
| 11,113,699 | B2 | 9/2021 | Radocchia et al. |
| 11,354,676 | B2 | 6/2022 | Radocchia et al. |
| 11,580,536 | B2 | 2/2023 | Kinney |
| 12,045,814 | B2 * | 7/2024 | Sabandith ............ B41J 2/17546 |
| 12,164,537 | B1 * | 12/2024 | James Lewis ............ H04L 9/50 |
| 12,225,008 | B1 * | 2/2025 | Yoon ........................ H04L 63/08 |
| 12,406,268 | B1 * | 9/2025 | Jones, Jr. ............. G06Q 30/018 |
| 2015/0068672 | A1 * | 3/2015 | Tsay ................. G06K 19/07722 156/249 |
| 2015/0143459 | A1 * | 5/2015 | Molnar ................... H04L 67/02 726/2 |
| 2016/0358186 | A1 | 12/2016 | Radocchia et al. |
| 2016/0358187 | A1 | 12/2016 | Radocchia et al. |
| 2017/0300928 | A1 | 10/2017 | Radocchia et al. |
| 2017/0345019 | A1 | 11/2017 | Radocchia et al. |
| 2020/0057876 | A1 | 2/2020 | Chang |
| 2020/0228955 | A1 | 7/2020 | Quarto et al. |
| 2020/0304367 | A1 * | 9/2020 | Berdy ................. H04L 41/0806 |
| 2021/0133737 | A1 | 5/2021 | Kinney |
| 2021/0158372 | A1 * | 5/2021 | Dittmann ................ G06F 21/44 |
| 2022/0229924 | A1 | 7/2022 | Pevzner |
| 2022/0239495 | A1 * | 7/2022 | Norton .................. H04L 9/0825 |
| 2022/0366061 | A1 * | 11/2022 | Spivack ................ H04L 9/3271 |
| 2022/0391926 | A1 | 12/2022 | Chen et al. |
| 2023/0010172 | A1 * | 1/2023 | Myers ................... H04L 9/0819 |
| 2023/0131380 | A1 | 4/2023 | Sandu |
| 2023/0147221 | A1 * | 5/2023 | Fileccia ........... G06K 19/06037 340/572.1 |
| 2023/0206199 | A1 | 6/2023 | Chua et al. |
| 2024/0020354 | A1 * | 1/2024 | Benedetto .............. G06Q 30/06 |

FOREIGN PATENT DOCUMENTS

| | | | |
|---|---|---|---|
| WO | 2019153417 | A1 | 8/2019 |
| WO | 2020231328 | A1 | 11/2020 |
| WO | 2024119063 | A1 | 6/2024 |

OTHER PUBLICATIONS

Ziyuan Wang et al., “ArtChain: Blockchain-enabled Platform for Art Martketplace,” 2019, pp. 447-454 (Year: 2019).*

International Preliminary Report on Patentability in related International Application No. PCT/US2023/082056, dated Jun. 12, 2025, 17 pages.

Futterer, A, Top 5 NFC Tag Types for Brand Protection, TrackMatrix, accessed Nov. 7, 2022, www.trackmatrix.com/nfc-tag-types-brand-protection/.

International Search Report and Written Opinion of the International Searching Authority in related International Application No. PCT/US2023/082056, dated May 24, 2024, 21 pages.

NXP, Make Your Products Smarter and More Secure with RFID-NFC, Sep. 2016, 16 pages.

Radocchia, S, An Introduction To Art On Blockchain: Applications And Industry Affects, Mar. 1, 2018, accessed Sep. 21, 2022, www.medium.com/blockchain-art-collective/an-introduction-to-art-on-blockchain-applications-and-industry-affects-cf37809756e2www.medium.com/blockchain-art-collective.

* cited by examiner

PRESTON
BLAIR

CERTIFICATE OF AUTHENTICITY

PRESTON BL
PHARMAKON 103, 2
silkscreen on *French Paper, 100 lb pa*
20 x 26 inches
ID PB0103

Print 103 is the third variant of the first desi
series. It was on display at the Miller ICA
during May of 2023

Signature of Artist

This document certifies that the piece desc
artwork by PRESTON B

PRESTON BLAIR, New Y
626-340-5011 www.preston

Mobile Device
920

Sign In

User name

Password

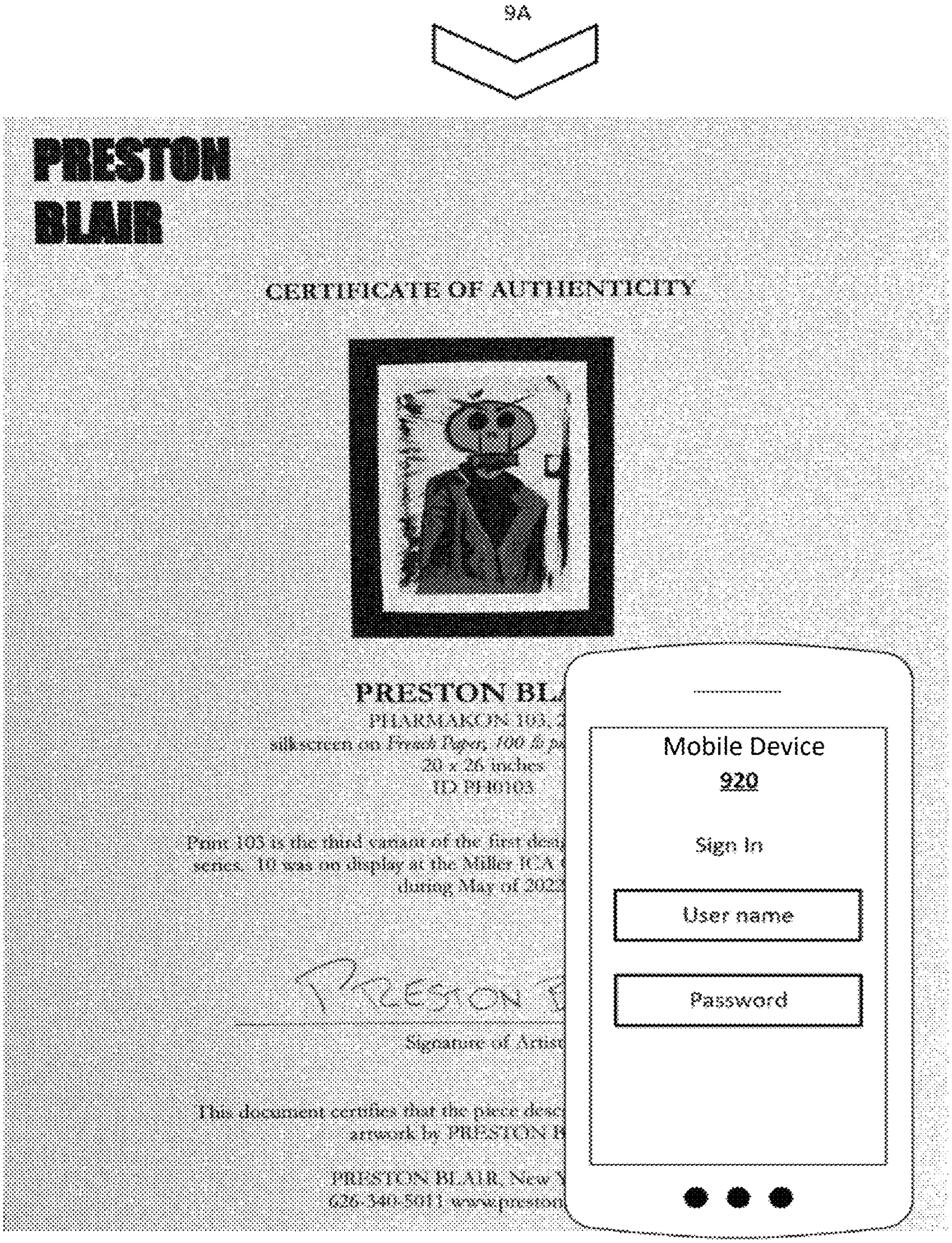

FIG. 9B

ARTWORK REMOTE AUTHENTICATION SYSTEM

CROSS-REFERENCE TO RELATED APPLICATIONS

This application is a continuation and claims the benefit of PCT Application Serial No. PCT/US2023/0872056 designating the United States, titled "Artwork Remote Authentication System," filed by Preston Blair, on Dec. 1, 2023, which claims the benefit of U.S. Provisional Application Ser. No. 63/385,743, titled "Artwork Trading System," filed by Preston Blair, on Dec. 1, 2022, and U.S. Provisional Application Ser. No. 63/582,194, titled "Artwork Transfer and Logistic Authentication System," filed by Preston Blair, on Sep. 12, 2023.

This application incorporates the entire contents of the foregoing application(s) herein by reference.

TECHNICAL FIELD

Various embodiments relate generally to securely modify, transfer, and view artwork narrative and data.

BACKGROUND

Art has been an integral part of human culture for millennia, serving as a means of expression, communication, and social commentary. An art market, for example, including a global network of buyers, sellers, and intermediaries who buys and sells art, may include a wide range of activities, from the auction of major masterworks to the sale of emerging artists' works at galleries and fairs.

The value of art may sometimes be subjective. For example, the value of an art may vary greatly depending on a variety of factors, such as the artist's reputation, the rarity of the work, and the prevailing taste of the time. In some examples, the art market may be subjected to criminal activities including fraud, forgery, and theft. These activities may reduce confidence and/or increase entry barriers for people to participate in the art market.

In recent years, the rise of online art platforms may provide a new method for buyers and sellers of art to connect. Despite the digital revolution, traditional art fairs and exhibitions remain cornerstones of the global art market. These physical gatherings provide a tangible platform for artists to showcase their creations and for collectors to immerse themselves in the world of art. Fairs and exhibitions foster a sense of community and connoisseurship, allowing individuals to not only acquire artworks but also engage in meaningful conversations and cultivate deeper connections with the artistic realm.

SUMMARY

Apparatus and associated methods relate to an artwork authenticity owner validation system. In an illustrative example, an artwork remote identification system (ARIS) may include an artwork companion chip (ACC) and a certificate of authenticity (COA). The ACC, for example, may be physically attached to an artwork. The ACC and the COA, for example, may each include a unique identifier. For example, a centralized server may be configured to automatically authenticate an ownership of the artwork attached to the ACC by validating the ACC and the COA. For example, the user may scan the COA and then the ACC within a predetermined time limit to gain access to modify an ownership record in an artwork profile of the artwork. Various embodiments may advantageously allow a modification to the ownership information only when the centralized authentication server validates the COA and the ACC within the predetermined time period.

Various embodiments may achieve one or more advantages. For example, some embodiments may advantageously detect a location of the artwork to prevent theft. Some embodiments, for example, may be event-triggered to advantageously conserve power. For example, some embodiments may advantageously allow automatic detection of transaction without initiation of buyer and seller from the transaction. Some embodiments may, for example, advantageously prevent thefts and unauthenticated sales of the artwork. For example, some embodiments may advantageously prevent illegitimate access to private information of the artwork. Some embodiments, for example, may advantageously improve the tracking and authentication of the artwork and/or prevent counterfeiting. For example, some embodiments may advantageously uniquely identify artwork with NFC tags.

The details of various embodiments are set forth in the accompanying drawings and the description below. Other features and advantages will be apparent from the description and drawings, and from the claims.

BRIEF DESCRIPTION OF THE DRAWINGS

FIG. 9A, FIG. 9B, and FIG. 9C depict an exemplary embodiment of an exemplary certificate of authenticity.

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an artwork remote identification system (ARIS) is introduced with reference to FIGS. 1-2B. Second, that introduction leads into a description with reference to FIGS. 3A-B of some exemplary embodiments of artwork transfer logistic authentication servers. Third, with reference to FIGS. 4-8, this document describes exemplary apparatus and methods useful for remotely registering and authenticating a genuine artwork. Sixth, this disclosure turns to a review of exemplary embodiments of private and public data tags with reference to FIGS. 9A-10C. Finally, the document discusses further embodiments, exemplary applications and aspects relating to ARIS.

Figure 1:
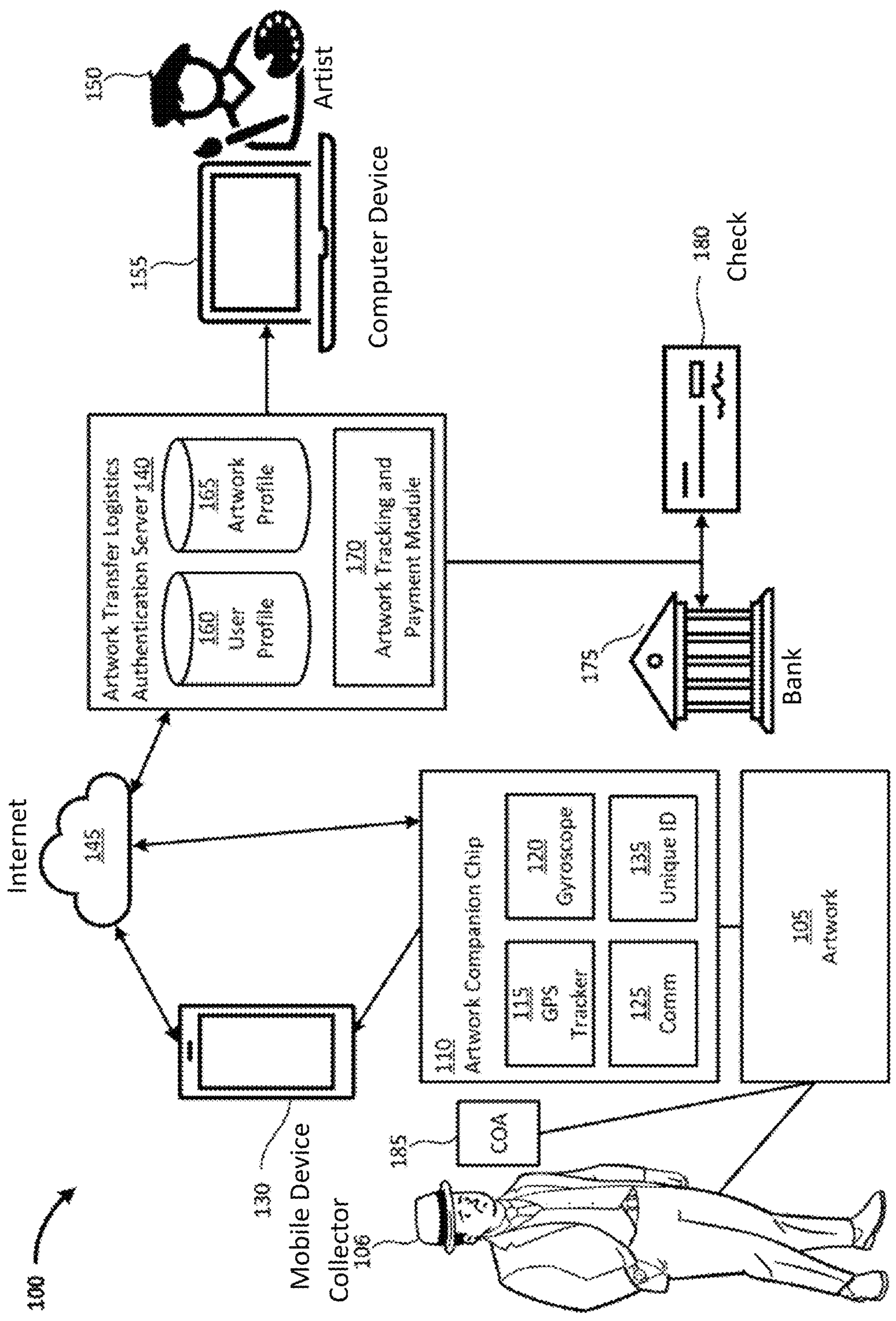
FIG. 1 depicts an exemplary artwork remote identification system (ARIS) employed in an illustrative use-case scenario.

FIG. 1 depicts an exemplary artwork remote identification system (ARIS) employed in an illustrative use-case scenario. In this example, the ARIS 100 includes an artwork 105. For example, the ARIS 100 may be configured to manage royalty for fine artists. The artwork 105, for example, may be displayed in an art gallery. As shown, the artwork 105 is owned by a collector 106. For example, the artwork 105 may be displayed in a museum. For example, the artwork 105 may be displayed in an exhibition (e.g., the Art Basel, the Art Koln, other art fairs). For example, the artwork 105 may be displayed in an auction house.

The artwork 105 is connected (physically or wirelessly) to an artwork companion chip (ACC 110). For example, the ACC 110 may be fixedly coupled to a frame of the artwork 105. For example, the ACC 110 may be installed at a back of an oil painting canvas. In some implementations, the ACC 110 may be attached to the artwork 105 like a sticker.

As shown, the ACC 110 includes a global positioning system tracker (GPS tracker 115), a gyroscope 120, and a communication module 125. In some implementations, the GPS tracker 115 and the gyroscope 120 may be used to track a location of the artwork 105 attached to the ACC 110.

In some implementations, the GPS tracker 115 may be configured to turn on by the gyroscope 120. For example, the GPS tracker 115 may be activated by a detection of movement by the gyroscope 120 to advantageously conserve power. In some implementations, the GPS tracker 115 may be configured to periodically retrieve location of the artwork 105 to advantageously conserve power. For example, the GPS tracker 115 may retrieve the location once a day. For example, the GPS tracker 115 may retrieve the location once a week. For example, the GPS tracker 115 may retrieve the location bi-weekly. In various implementations, the ACC 110 may notify a user (e.g., the collector 106) to change its battery.

The ARIS 100 includes a mobile device 130. The collector 106, for example, may use the mobile device 130 to access the ACC 110. For example, the mobile device 130 may access the ACC 110 via a near field communication (NFC) chip of the communication module 125. For example, the mobile device 130 may access the ACC 110 via a communication port (e.g., a USB port) of the communication module 125.

In this example, the ACC 110 also includes a unique identifier (unique ID 135). For example, the unique ID 135 may be used to associate the ACC 110 with the artwork 105 in the system. In some implementations, the mobile device 130 may access information of the ACC 110 by scanning a quick response (QR) code generated based on the unique ID 135. For example, upon scanning the QR code, the mobile device 130 may access a cloud database storing information related to the artwork 105. For example, the mobile device 130 may receive information (e.g., location information) from the ACC 110.

As shown, the mobile device 130 is coupled to an artwork transfer logistic authentication server (ATLAS 140) via the Internet 145. For example, the mobile device 130 may transmit information received from the ACC 110 to the ATLAS 140. For example, the mobile device 130 may receive information of the artwork 105 from the ATLAS 140.

In the depicted example, the ACC 110 may transmit data to the ATLAS 140 via the internet 145. In some implementations, the communication module 125 may be configured to be connected to the internet 145 via mobile communication signals (e.g., broadband cellular network). In some implementations, the communication module 125 may be connected to the internet 145 via a wireless network and a router. In various examples, the ATLAS 140 may receive information, such as location information, from the ACC 110 related to the artwork 105.

In this example, an artist 150 may access the ATLAS 140 using a computer device 155. In some implementations, the artist 150 may use the ARIS 100 to check in with various artwork he/she created by accessing the ATLAS 140.

As shown, the ATLAS 140 includes a user account profile database (UPDB 160), an artwork profile database (APDB 165), and an artwork tracking and payment module (ATAPM 170). In some implementations, the UPDB 160 includes information of users of the ATLAS 140. For example, the UPDB 160 may include an address and contact information of an art collector. For example, the UPDB 160 may include an address and contact information of an art gallery. For example, the UPDB 160 may include an address and contact information of an auction house. For example, the UPDB 160 may include an address and contact information of an artist. In some implementations, the UPDB 160 may include artwork transactions of a user. For example, the UPDB 160 may include information indicating which artwork is in possession of the user.

In some implementations, the UPDB 160 may include a financial account information of a user. For example, the financial information may include an account payable and an account receivable from a user to the ARIS 100.

The APDB 165, for example, may include a database of the ACC 110 associated with the artwork 105. For example, the ACC 110 may be registered with the artwork 105 so that the location of the artwork 105 may be represented by the location of the ACC 110. In some implementations, the APDB 165 may include transaction information of the artwork 105. For example, the transaction information may include current and previous owners' identity of the artwork 105. For example, the transaction information may include purchase prices of the artwork in each transaction between the owners. For example, the transaction information may include rules calculating compensation for various previous owners (e.g., artist, galleries, collectors) of the artwork 105 in case of a transaction. In some implementations, the APDB 165 may include a current location of the artwork 105. For example, the current location may be updated when the mobile device 130 retrieves information from the ACC 110.

In some implementations, the ATAPM 170 may track and authenticate movement of an artwork. For example, the ATAPM 170 may receive location information of the artwork 105. Based on the location information, for example, the ATAPM 170 may authenticate the movement of the artwork 105.

The ATAPM 170, for example, may include an account for each user (e.g., the artist 150, a gallery, a collector) associated with the ARIS 100. In some implementations, the ATAPM 170 may determine a payment based on a set of payment rules associated with the artwork 105 (e.g., in the APDB 165). As shown, the ATAPM 170 may initiate payment via direct deposit at a bank 175 and by issuing a check 180. For example, when there is a transaction of the artwork 105 (e.g., a collector buys the artwork 105 from a gallery), the ATAPM 170 may transfer compensation (e.g., a portion of the selling price) to the artist 150 using the bank 175 or the check 180.

In an illustrative example, a trigger event may be generated that the artwork 105 is moved. For example, the ACC 110 may detect a movement of the artwork 105. In some implementations, the ATLAS 140 may transmit a notification of the trigger event to the artist 150. In some implementations, the ATLAS 140 may also transmit a signal to the collector 106. For example, the signal may trigger the mobile device 130 to ask the collector 106 to authenticate the movement of the artwork 105. For example, the collector 106 may respond to authenticate by scanning an RFID of the ACC 110 with the mobile device 130. For example, the authentication may prove that the artwork 105 is still in hands of the collector 106. For example, without authentication from the collector 106, the ATAPM 170 may identify that the artwork 105 had an unauthorized move. For example, the ATLAS 140 may block future movement of the artwork 105 because of potential theft. In some implementations, other buyers of the artwork 105 may retrieve information from the ACC 110 that the artwork 105 is not authentic. For example, the buyer may then refuse to purchase.

In some examples, the movement may be authenticated because there is an authorized transaction (e.g., selling of the artwork 105, leasing of the artwork for an exhibition). For example, the ATAPM 170 may use information stored in the APDB 165 to determine a payment for the artist 150. For example, the ATAPM 170 may send a fund request to the collector 106 to collect the payment required to pay the artist 150. For example, the ATAPM 170 may place a hold status to the artwork 105 in the APDB 165 until payment is completed. In various examples, the ARIS 100 may advantageously allow automatic detection of transaction without initiation of buyer and seller from the transaction.

In some examples, the collector 106 may be lending the artwork 105 to another place (e.g., gallery, museum) for exhibition. In this example, the collector 106 possesses a certificate of authenticity (COA 185) related to the artwork 105. For example, the COA 185 may include a unique identifier uniquely associated with the unique ID 135 in the ACC 110. In some implementations, the ATLAS 140 may require a change of ownership of the artwork 105 only if both the COA 185 and the ACC 110 are authenticated within a predetermined time (e.g., 1 minute, 3 minutes, 5 minutes). Various implementations may advantageously prevent thefts and unauthenticated sales of the artwork 105.

Figure 2A:
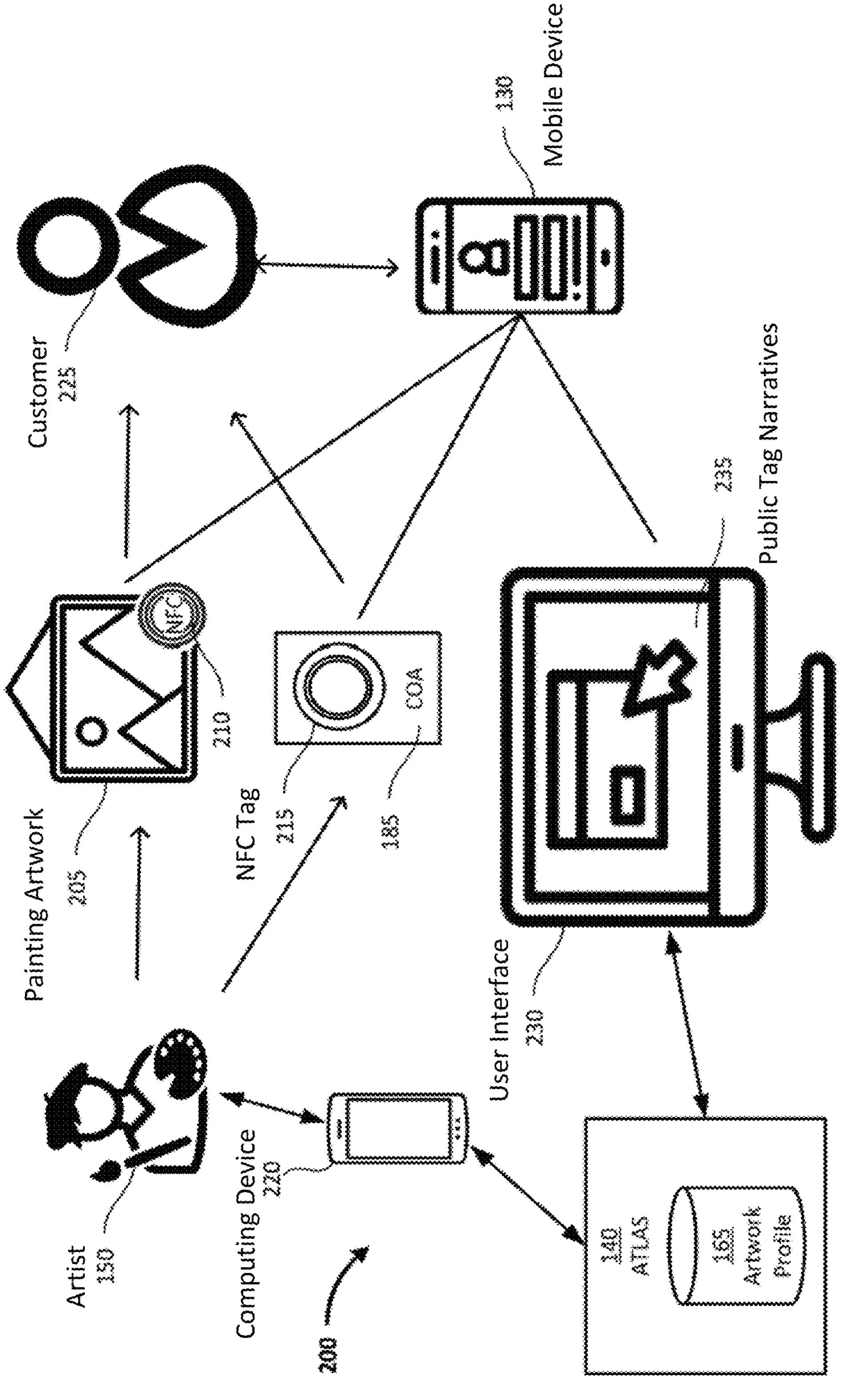
FIG. 2A and FIG. 2B are block diagrams depicting an exemplary artwork transfer logistic authentication server (ATLAS).
Figure 2B:
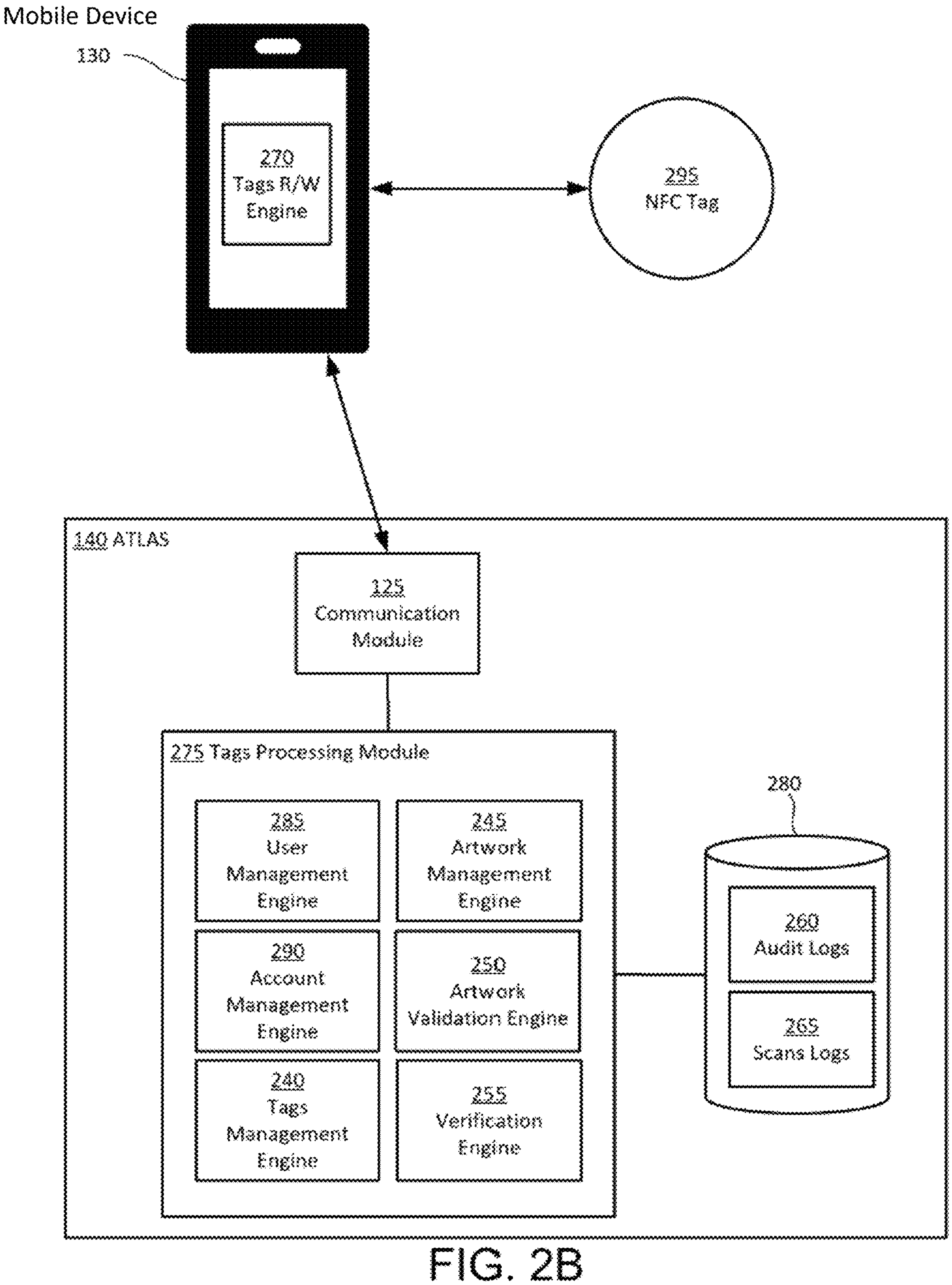

FIG. 2A and FIG. 2B are block diagrams depicting an exemplary artwork transfer logistic authentication server (ATLAS). As shown in FIG. 2A, an ARIS 200 the ATLAS 140. For example, the ATLAS 140 may include modules and data as described with reference to FIG. 1. In some implementations, the ATLAS 140 may include a centralized system with one or more artwork ledgers. For example, each of the artwork ledgers may include a collection of artwork.

As an illustrative example, the artist 150 may create a painting artwork 205. For example, at the same time, the artist 150 may generate the COA 185 associated with the painting artwork 205. In some embodiments, the COA 185 may be uniquely designed and generated by the artist 150 (e.g., on paper). In some implementations, for example, the painting artwork 205 may be chronicled. For example, in some embodiments, the COA 185 may be generated using a blockchain ledger. In some embodiments, the COA 185 may be generated using a system described in U.S. Provisional Application Ser. No. 63/385,743, titled "Artwork Tracking System," filed by the inventor of this application on Dec. 1, 2022. This application incorporates the entire contents of the foregoing application herein by reference.

As shown, a first near-field communication tag (first NFC tag 210) is attached to the painting artwork 205, a second NFC tag 215 is attached to the COA 185. For example, the first NFC tag 210 and the second NFC tag 215 may include crypto-sealed NFC devices. As an illustrative example without limitation, the first NFC tag 210 may include the unique ID 135. For example, one or both of the first NFC tag 210 and the second NFC tag 215 may include an encrypted unique identifier (UID). For example, the encrypted UID may be decrypted only when a private key is provided. In some implementations, the first NFC tag 210 and the second NFC tag 215 may be NFC chips. For example, the artist 150 may access the ATLAS 140 using a (NFC enabled) computing device 220. In some implementations, the first NFC tag 210 may be included in the ACC 110.

For example, the artist 150 may instantiate (e.g., registering, logging, creating an instance of) the painting artwork 205 in the ATLAS 140. For example, the ATLAS 140 may generate a pair of cryptographic keys for the painting artwork 205. In some implementations, the ATLAS 140 may program the first NFC tag 210 and the second NFC tag 215 with the cryptographic keys to be sent to the artist 150. In some examples, the artist 150 may have purchased the first NFC tag 210 and the second NFC tag 215 with cryptographic keys. Then, the artist 150 may, for example, register the painting artwork 205 with the first NFC tag 210 and the second NFC tag 215 using the computing device 220. In some embodiments, the artist 150 may link pre-purchased NFC tags (e.g., by scanning the tags) at the ATLAS 140 to the painting artwork 205 using the computing device 220.

In some implementations, the first NFC tag 210 and the second NFC tag 215 may include NFC tags configured for high-security applications. For example, the first NFC tag 210 and the second NFC tag 215 may be a read-only tag that can be programmed once. In some examples, the first NFC tag 210 and the second NFC tag 215 may include NTAG 424DNA tags. For example, the first NFC tag 210 and the second NFC tag 215 may use DNA encoding for data security.

In some implementations, the artist 150 may use the computing device 220 (e.g., using a mobile application) to read the first NFC tag 210. For example, the ATLAS 140 may receive (serial) information from the first NFC tag 210 to be assigned as a public key. Using the public key, for example, the ATLAS 140 may assign a cryptographic ID number to the artwork. Then, for example, the artist 150 may adhere the first NFC tag 210 to artwork. Next, similarly the artist 150 may use the computing device 220 to read the second NFC tag 215 to be assigned as a private key. The ATLAS 140 may, for example, associate the private key with the COA 185. For example, the COA 185 may be stored separately with the painting artwork 205.

In this example, a customer 225 (e.g., the collector 106) may be considering an authenticity of the painting artwork 205. As shown, the customer 225 uses a mobile device 130. For example, the mobile device 130 may be an NFC enabled smartphone. In this example, the customer 225 may use the (NFC-enabled) mobile device 130 to read the second NFC tag 215. For example, the mobile device 130, upon scanning the second NFC tag 215 may generate a unique URL address. In some examples, the mobile device 130 may include a mobile application. For example, the customer 225 may use the mobile application to read the first NFC tag 210.

For example, the customer 225 may walk up to the painting artwork 205 and use the mobile device 130 to read the first NFC tag 210 (attached to the painting artwork 205). As shown, the mobile device 130 may read the data from the first NFC tag 210 and transmit the data to the ATLAS 140. In some implementations, the ATLAS 140 may retrieve artwork data based on the APDB 165 as a function of the received data. Based on an artwork profile, the ATLAS 140 may generate a user interface 230 at the mobile device 130. For example, the user interface 230 may include public tag narratives 235. In some implementations, the public narratives may be viewed by the public after the first NFC tag 210 is scanned, but modifiable only by authenticated users. For example, the public tag narratives 235 may be customizable by a current owner of the painting artwork 205. For example, the public tag narratives 235 may include anonymous owner or sharing name of the current owner, contact information of a sales agent, social media information of the artist 150).

In some implementations, an authorized keyholder of the COA 185 may log into the ATLAS 140 with credentials. For example, the authorized keyholder may be stored in the UPDB 160. For example, a current owner holding the COA 185 may scan the second NFC tag 215 (e.g., the private tag). For example, scanning of the public key and the private key may authorize a legitimate ownership transaction of the painting artwork 205 to a next owner as long as the scanning device is authenticated as one of the authorized keyholders of the painting artwork 205.

In some implementations, the ATLAS 140 may include a predetermined time limit (e.g., 30 seconds after scanning of a private tag) to scan the first NFC tag 210 associated with the second NFC tag 215. For example, authorization may occur when the public key and the private key are scanned in a certain (e.g., predetermined) order (e.g., private then public). For example, the predetermined time limit may advantageously prevent illegitimate access to private information of the painting artwork 205 by obtaining the first NFC tag 210 hours after scanning the second NFC tag 215 without consent of the owner. Various embodiments may advantageously improve the tracking and authentication of the painting artwork 205 and/or prevent counterfeiting.

In some implementations, the ATLAS 140 may include a predetermined pre-authorization. For example, after scanning the first NFC tag 210 and the second NFC tag 215, the ATLAS 140 may require authorization from a current record holder (e.g., current owner) prior to completing a transaction. Upon receiving the authorization, the ATLAS 140 may update the record holder based on input(s) received from the physical holder of the first NFC tag 210 and the second NFC tag 215.

In an example shown in FIG. 2B, the ATLAS 140 includes a communication module 125, a tags processing module (TPM 275), and a data store 280. As shown, the communication module 125 may be configured to communicate with the mobile device 130. For example, the mobile device 130 may include the user interface 230.

The mobile device 130 may be NFC enabled, for example. In this example, the mobile device 130 scans an NFC tag 295. For example, the mobile device 130 may read data stored in the NFC tag 295. The mobile device 130 may, for example, transmit the data read from the NFC tag 295 to the ATLAS 140 using the communication module 125.

The TPM 275 includes a user management engine 285, an account management engine 290, and a tags management engine 240. The user management engine 285, for example, may create new users. For example, the user management engine 285 may create admin users authorized to register a new NFC Tag and/or add a new artwork against the NFC Tag. In some examples, the admin user may create/view/edit/delete artworks. The account management engine 290, for example, may access and/or modify user accounts in the ATLAS 140. The tags management engine 240, for example, may allow an authenticated user (e.g., the artist 150) to manage NFC tags in his/her corresponding user account. For example, the authenticated user may register, view and/or delete NFC Tags.

The TPM 275 also includes an artwork management engine 245, an artwork validation engine 250, and a verification engine 255. For example, the artwork management engine 245 may add an artwork (e.g., the artwork 105) against an NFC Tag. For example, the NFC tag may be registered using the tags management engine 240 on the user's account. For example, a user may use the tags management engine 240 to create, view, edit, and/or delete the artworks in a user account. For example, when the user scans a private NFC tag (e.g., the second NFC tag 215) of an artwork, the user may, for example, edit/enter a location and a collector of the artwork. For example, when the user scans the public NFC tag (e.g., the first NFC tag 210), the user may only access a validity of the artwork. For example, on each artwork creation, the artwork management engine 245 may generate a random authorization key to be stored in a database. For example, the authorization key may be written to the NFC tag 295 using the mobile device 130 against that artwork.

The artwork validation engine 250, for example, may generate a redirection link to the mobile device 130 via the communication module 125 upon checking a validity of an artwork. For example, the artwork validation engine 250 may display information on the user interface 230 (e.g., at an artwork details page). For example, if an artwork is not valid, the artwork validation engine 250 may generate a message informing the customer 225 that the artwork is fake (e.g., not Valid). As an illustrative example, the artwork validation engine 250 may verify an authenticated location of the artwork against a location where a request signal is originated. For example, if the two locations are different, then the artwork validation engine 250 may determine that the artwork is (highly possibly) fake.

The verification engine 255, for example, may validate the NFC tag 295 by decrypting an URL of a scanned NFC tag and get a counter and a unique identification of the NFC tag 295. For example, the verification engine 255 may check the counter, the unique identification, and the artwork validity. For example, the verification engine 255 may generate a response based on the checking result. In some implementations, the verification engine 255 may use an encrypted message (e.g., using an advanced Encryption Standard 256-bit protocol) for transmitting the encrypted keys (e.g., the private keys and the public keys).

The data store 280 includes audit logs 260 and scan logs 265. For example, the audit logs 260 include logs for each database transaction between a user and the ATLAS 140. For example, the audit logs 260 may include e-information (e.g., username, user identification number, action type, time stamp, user location) of performed actions by the user into the ATLAS 140. The scan logs 265, for example, may include statistics for each NFC tag scan done by a user. For example, the scan logs 265 may include information of a scan performed by the user into the ATLAS 140. For example, the ATLAS 140 may use the scan logs 265 to generate analytics reports in future.

In this example, the mobile device 130 includes a tags read/write engine 270. For example, the tags read/write engine 270 may be included in a mobile application. For example, the tags read/write engine 270 may be included in a web application during communication between the mobile device 130 and the communication module 125. In some implementations, the tags read/write engine 270 may be used to read and write the NFC tag 295. To write the NFC tag 295, for example, the tags read/write engine 270 may include an authentication key received from the ATLAS 140 associated with the NFC tag 295. For example, the authentication key may be provided by the verification engine 255. Various embodiments may advantageously uniquely identify artwork with NFC tags.

In various implementations, an artwork validation system may include a centralized authentication server (e.g., the ATLAS 140) configured to manage artwork meta data (e.g., the UPDB 160 and the APDB 165) comprising a certificate of authenticity (e.g., the COA 185) uniquely identifying an ownership of an artwork stored in a private data chip (e.g., the second NFC tag 215), and a unique identifier of the artwork stored in a public data chip (e.g., the first NFC tag 210, the ACC 110) physically attached to the artwork. For example, the centralized server may generate a signal to release and/or transfer of an ownership of the artwork only when a centralized authentication server validates the private contactless chip and the public contactless chip within a predetermined time limit.

Figure 3A:
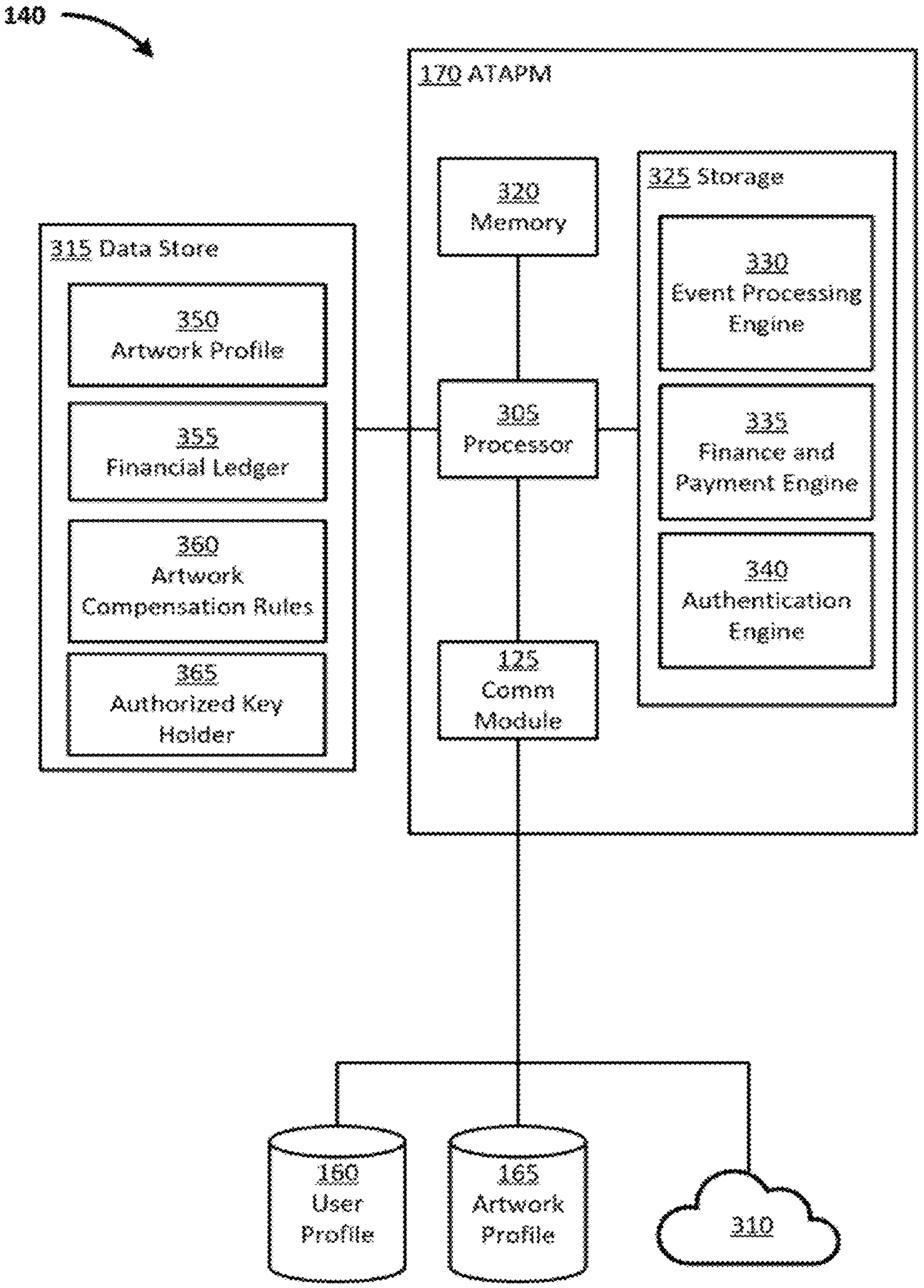
FIG. 3A and FIG. 3B are block diagrams depicting an exemplary ATLAS using an artwork tracking and payment module.
Figure 3B:
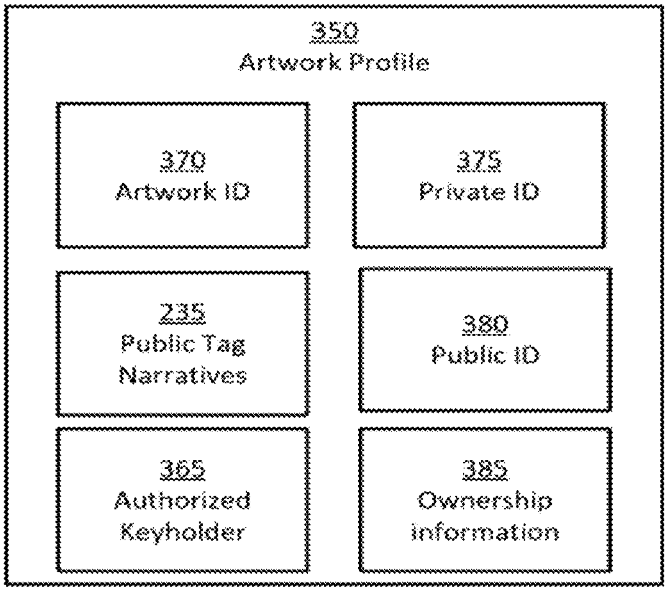

FIG. 3A and FIG. 3B are block diagrams depicting an exemplary ATLAS using an artwork tracking and payment module. As shown in FIG. 3A, the ATAPM 170 includes a processor 305. The processor 305 may, for example, include one or more processing units. The processor 305 is operably coupled to a communication module 125. The communication module 125 may, for example, include wired communication. The communication module 125 may, for example, include wireless communication. In the depicted example, the communication module 125 is operably coupled to the UPDB 160, the APDB 165, and a cloud network 310 (e.g., the Internet). For example, the ATAPM 170 may access the cloud network 310 to transmit notification to the artist 150. For example, the ATAPM 170 may access the cloud network 310 to receive authentication signals from the collector 106. For example, the ATAPM 170 may receive new artwork profiles from the computer device 155.

The processor 305 is operably coupled to a memory module 320. The memory module 320 may, for example, include one or more memory modules (e.g., random-access memory (RAM)). The processor 305 includes a storage module 325. The storage module 325 may, for example, include one or more storage modules (e.g., non-volatile memory). In the depicted example, the storage module 325 includes an event processing engine (EPE 330), a finance and payment engine (FAPE 335), and an authentication engine (AE 340). The EPE 330 may, for example, be triggered by a trigger event transmitted from the ACC 110. For example, the EPE 330 may be activated upon receipt of a movement of the artwork 105. Upon activation, the EPE 330 may transmit authentication requests and/or notifications to an artist device.

The FAPE 335, for example, may be configured to determine financial information of users. For example, the FAPE 335 may, based on a transaction information including price, a buyer identity, a seller identity, and the artwork identity, determine a payout for each of previous owners of the artwork. For example, in some implementations, the FAPE 335 may be configured to transmit fund requests from a buyer or a seller for payment. In some implementations, the FAPE 335 may also retrieve payment information to arrange payment to recipients. For example, the payment information may include recipients' bank account number or mailing address.

The AE 340, for example, may be configured to authenticate movement of an artwork. For example, the EPE 330 may trigger the AE 340 to transmit an authentication request to an owner of an artwork. In some implementations, the AE 340 may use the communication module 125 to transmit an authentication request and receive responses. For example, the AE 340 may also process the received response to generate an authentication result. For example, the AE 340 may compare user credentials. For example, the AE 340 may also compare a location of a user device compared to a location of an ACC 110 associated with the artwork. Based on the authentication result, the AE 340 may update a status of the artwork.

The processor 305 is further operably coupled to a data store 315. The data store 315 includes an artwork profile 350, a financial ledger 355, and an artwork compensation rules 360. For example, the artwork profile 350 may include, for each artwork associated with the ARIS 100, an associated ACC 110 with the artwork. The artwork profile 350 may also include a creator profile (e.g., the artist 150), and owners' information (e.g., identity and address of previous owners) associated with the artwork. The artwork profile 350 may also include a status information for each artwork. For example, an artwork may be "normal" when no trigger event has been recorded. An artwork may be "blocked" after an unauthenticated movement has been recorded. An artwork may be "in transit" after an authenticated movement has been recorded but has yet to arrive at a new owner's hand.

The financial ledger 355 may include an account payable and an account receivable from different users of the ARIS 100. For example, the financial ledger 355 may include accounts for registered artists. For example, the financial ledger 355 may include accounts for registered galleries. For example, the financial ledger 355 may include accounts for registered museums. For example, the financial ledger 355 may include accounts for registered art collectors. In various implementations, the FAPE 335 may process the account to generate fund requests and/or payment requests to settle the account. For example, the FAPE 335 may generate the requests periodically (e.g., bi-monthly, monthly, weekly, daily). In some implementations, the FAPE 335 may generate the requests based on requests generated from a user device (e.g., the computer device 155).

In various implementations, the FAPE 335 may use rules stored in the artwork compensation rules 360 to determine the compensation to various entities (e.g., the artist, the galleries). The artwork compensation rules 360 may, for example, be selectively associated with a new artwork when the new artwork is registered in the ARIS 100. In various implementations, the ATAPM 170 may advantageously regulate truthful, traceable, and authentic transactions of artworks.

In this example, the data store 315 also includes an authorized key holder 365. For example, the AE 340 may retrieve the authorized key holder 365 corresponding to an artwork when an ownership transfer modification to the artwork profile 350 is initiated. For example, the AE 340 may permit a modification to the artwork profile 350 in ownership only when a credential provided by the user is matching the credential in the authorized key holder 365.

In various implementations, a public data chip (e.g., the ACC 110) may include a position sensor (e.g., the GPS tracker 115) configured to transmit a location of an artwork to the central authentication server. For example, if the location is not within a predetermined geofence, a central authentication server (e.g., the ATAPM 170) may generate an alert to one or more predetermined users.

FIG. 3B shows an exemplary artwork profile as described with reference to FIG. 3A. In this example, the artwork profile 350 of an artwork includes an artwork ID 370. For example, the ID 370 is generated when an artwork (e.g., the painting artwork 205, the artwork 105) is registered to the ARIS 100. The artwork profile 350 also includes a private ID 375 and a public ID 380. In various implementations, the private ID 375 and the public ID 380 may be uniquely associated with the artwork profile 350. For example, the private ID 375 may be stored in the artwork profile 350 when the artist 150 registers the second NFC tag 215 to the ARIS 100 corresponding to the painting artwork 205. For example, similarly, the public ID 380 may be saved to the artwork profile 350 when the artist 150 register the first NFC tag 210 to the ARIS 100. For example, the first NFC tag 210 may be attached to the painting artwork 205 physically.

In this example, the artwork profile 350 also includes an ownership information 385. For example, the ownership information 385 may include present and historical (legitimate) owners of the artwork. In some implementations, the present owner may automatically be saved as the authorized key holder 365. In some implementations, the authorized key holder 365 of the artwork profile 350 may be reset once the ownership information 385 is updated. As shown, the artwork profile 350 also includes public tag narratives 235. For example, the public tag narratives 235 may be modified by users listed in the authorized key holder 365.

Figure 4:
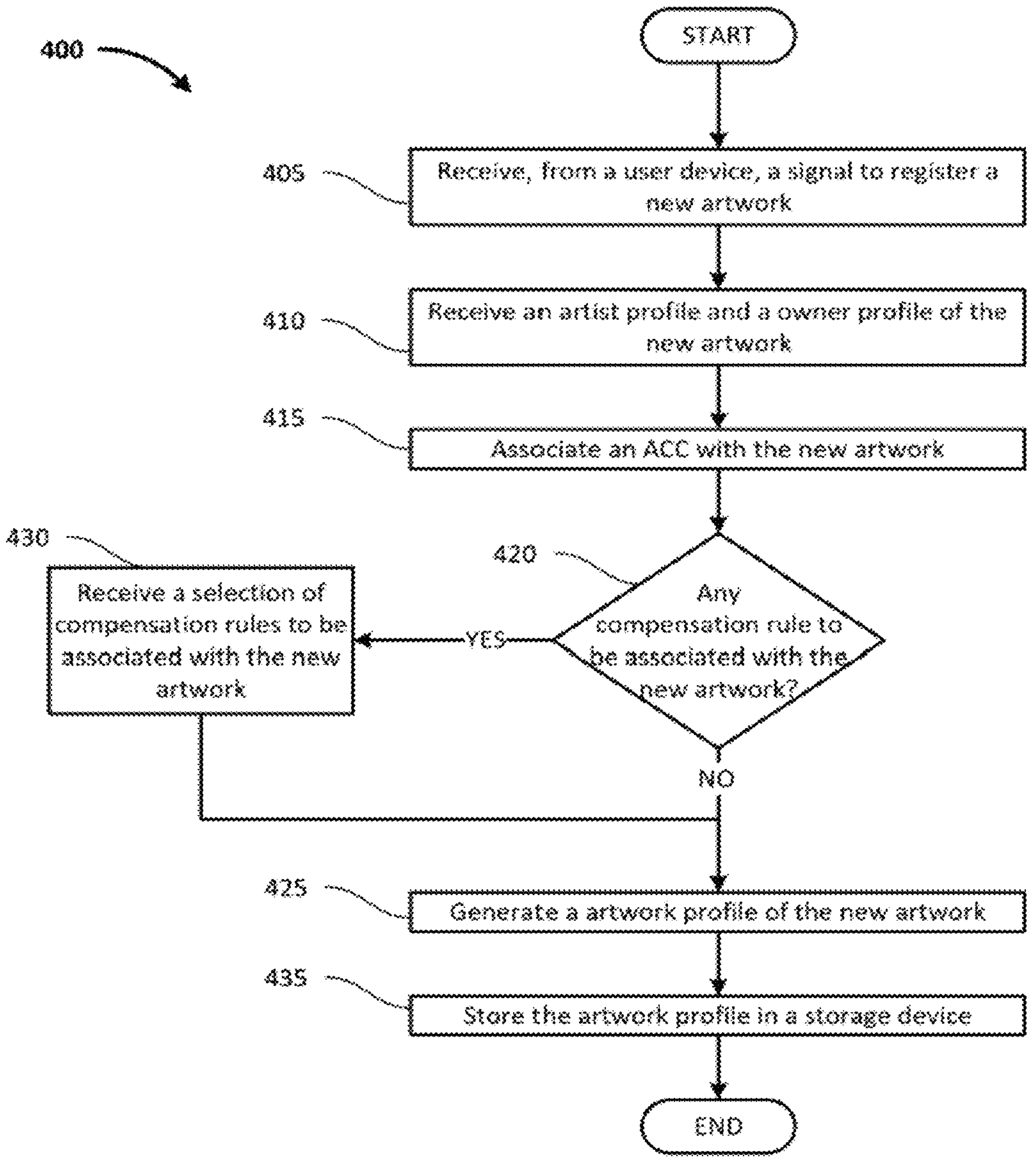
FIG. 4 is a flowchart illustrating an exemplary ATAPM setup method.

FIG. 4 is a flowchart illustrating an exemplary ATAPM setup method. For example, the ATAPM 170 may perform the method 400 to set up a new artwork in the ATLAS 140. In this example, the method 400 begins when a signal is received from a user device to register a new artwork in step 405. For example, upon completion of a new artwork, the artist 150 may use the computer device 155 to register the new artwork to the ATLAS 140.

In step 410, an artist profile and an owner profile of the new artwork is received. For example, the artist 150 may select, using the computer device 155, his/her profile as the artist profile and enter details of the artwork's buyer as the owner profile. In step 415, an artwork companion chip (ACC) is associated with the new artwork. For example, after attaching the ACC 110 to the artwork 105, an identification number (e.g., the unique ID 135) of the ACC 110 may be entered and associated within the ATLAS 140. In some examples, the artist 150 may scan the first NFC tag 210 of the ACC 110 to transmit the unique identifier of the first NFC tag 210 to the ATLAS 140.

In a decision point 420, it is determined whether there is any compensation rule to be associated with the new artwork. If there is no compensation rule to be associated with the new artwork, in step 425, an artwork profile of the new artwork is generated. For example, the artwork profile 350 is generated based on the artist profile and the owner profile. If there is any compensation rule to be associated with the new artwork, a selection of compensation rules to be associated with the new artwork is received in step 430. For example, a user may select one or more compensation rules from the artwork compensation rules 360, and the step 425 is repeated with also the selected compensation rules. Next, in step 435, the artwork profile is stored in a storage device and the method 400 ends.

Figure 5:
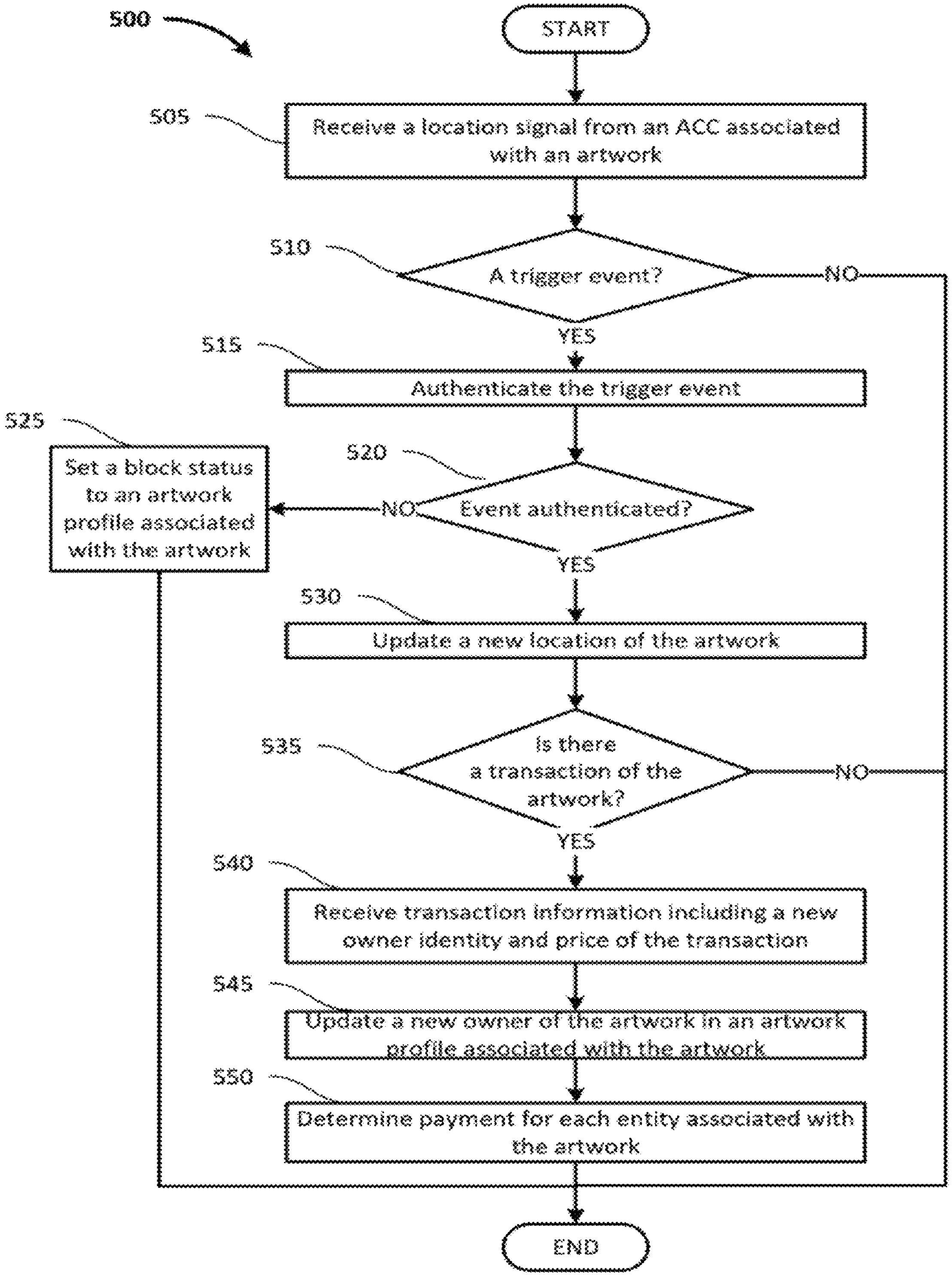
FIG. 5 is a flowchart illustrating an exemplary ATAPM tracking method.

FIG. 5 is a flowchart illustrating an exemplary ATAPM tracking method. For example, the ATAPM 170 may perform the method 500 to authenticate a movement of an artwork in the ARIS 100. In this example, the method 500 begins when a location signal is received from an ACC associated with an artwork in step 505. For example, the ATLAS 140 may receive a location detected by the GPS tracker 115. Next, in a decision point 510, it is determined whether it is a trigger event. For example, the EPE 330 may compare a change in geographical location of the artwork to a predetermined geofence. For example, the predetermined geofence may be stored in the artwork profile 350. If, for example, the change is out of the geofence, the EPE 330 may determine that the movement is a trigger event. If it is determined that it is not a trigger event, the method 500 ends. If it is determined that it is a trigger event, in step 515, the trigger event is authenticated. For example, the AE 340 may authenticate the trigger event by sending an authentication request to an associated owner of the artwork.

In a decision point 520, it is determined whether the trigger event is authenticated. If the trigger event is not authenticated, in step 525, a block status is set to an artwork profile (e.g., the artwork profile 350) associated with the artwork, and the method 500 ends. If the trigger event is authenticated, in step 530, a new location of the artwork is updated. For example, the new location may be updated to the artwork profile 350.

In a decision point 535, it is determined whether there is a transaction of the artwork. For example, at authentication, an associated owner of the artwork may provide a reason for the trigger event. Based on the reason, for example, the ATAPM 170 may determine whether there is a transaction (e.g., selling of the artwork, leasing of the artwork). If it is determined that there is no transaction of the artwork, the method 500 ends.

If it is determined that there is a transaction of the artwork, in step 540, transaction information including a new owner identity and price of the transaction are received. In some examples, the AE 340 may generate a request for additional information. For example, the AE 340 may validate the current user against the authorized key holder 365. Next, in step 545, a new owner of the artwork is updated in an artwork profile (e.g., the artwork profile 350) associated with the artwork. In step 550, a payment for each entity associated with the artwork is determined, and the method 500 ends. For example, the FAPE 335 may determine the payment based on the artwork profile 350 and selected artwork compensation rules 360.

Figure 6:
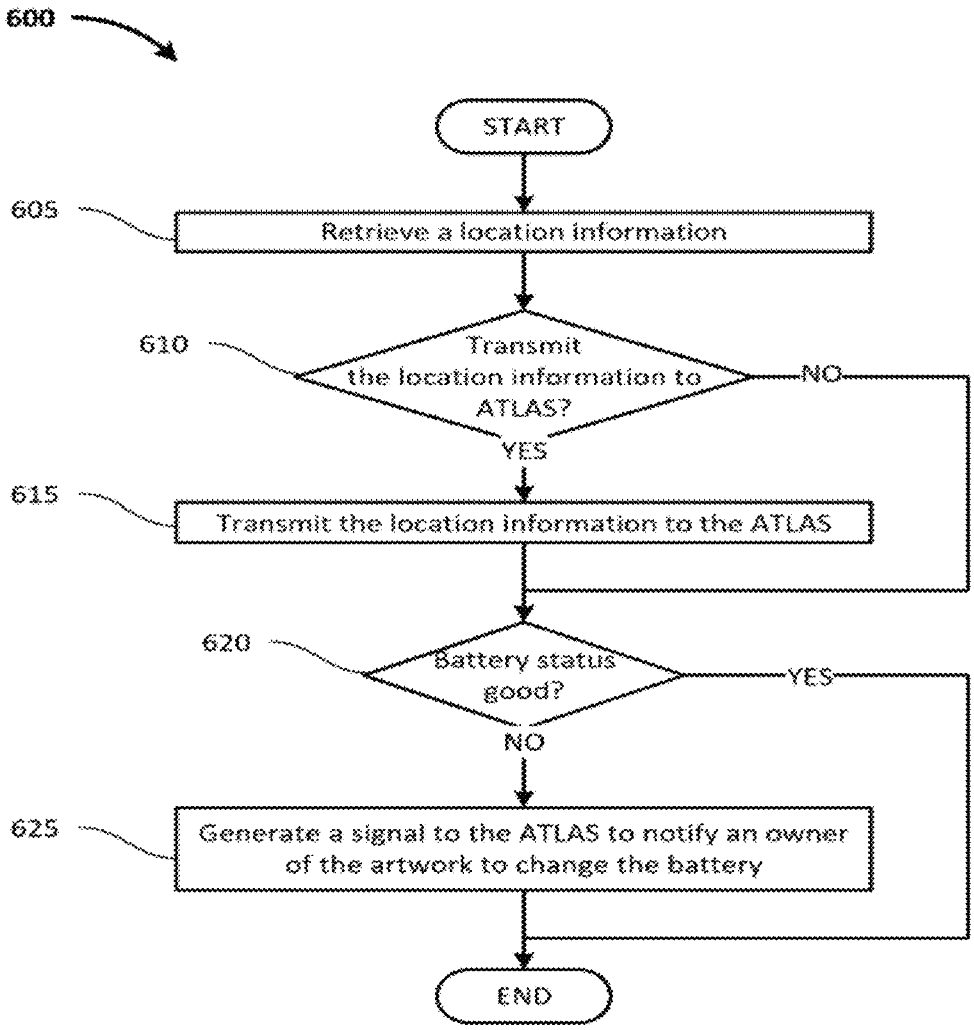
FIG. 6 is a flowchart illustrating an exemplary method for transmitting location information associated with an artwork by an exemplary artwork companion chip (ACC).

FIG. 6 is a flowchart illustrating an exemplary method for transmitting location information associated with an artwork by an exemplary artwork companion chip (ACC). For example, the ACC 110 may perform the method 600 to provide location information associated with the artwork 105 to the ATAPM 170. In this example, the method 600 begins when a location information is received in step 605. For example, the ACC 110 may be triggered to retrieve location information periodically. In some implementations, the ACC 110 may be triggered to retrieve location information when a user tries to connect to the ACC 110 with the mobile device 130. In some implementations, the ACC 110 may be triggered to retrieve location information by the gyroscope 120.

In a decision point 610, it is determined whether the location information is to be transmitted to the ATLAS 140. For example, the ACC 110 may determine whether the retrieved location is out of a predetermined geofence. If it is determined that the location information is to be transmitted to the ATLAS, in step 615, the location information is transmitted to the ATLAS. After the location information is transmitted, or if it is determined that the location information is not to be transmitted to the ATLAS in the decision point 610, it is determined whether a battery status is good in a decision point 620. If the battery status is good, then the method 600 ends. If the battery status is not good, in step 625, a signal is generated to the ATLAS to notify an owner of the artwork to change the battery, and the method 600 ends.

Alternatively, in some implementations, the ACC 110 may be configured to transmit the location information to the ATLAS 140 regardless of whether the retrieved location is out of the predetermined geofence. For example, the EPE 330 may be configured to determine, based on the location information and a "supposed" location of the artwork (e.g., retrieved from the artwork profile 350), whether the retrieved location is out of the predetermined geofence. In some implementations, the predetermined geofence may be customizable by the owner or other authorized keyholder within the artwork profile 350.

Figure 7:
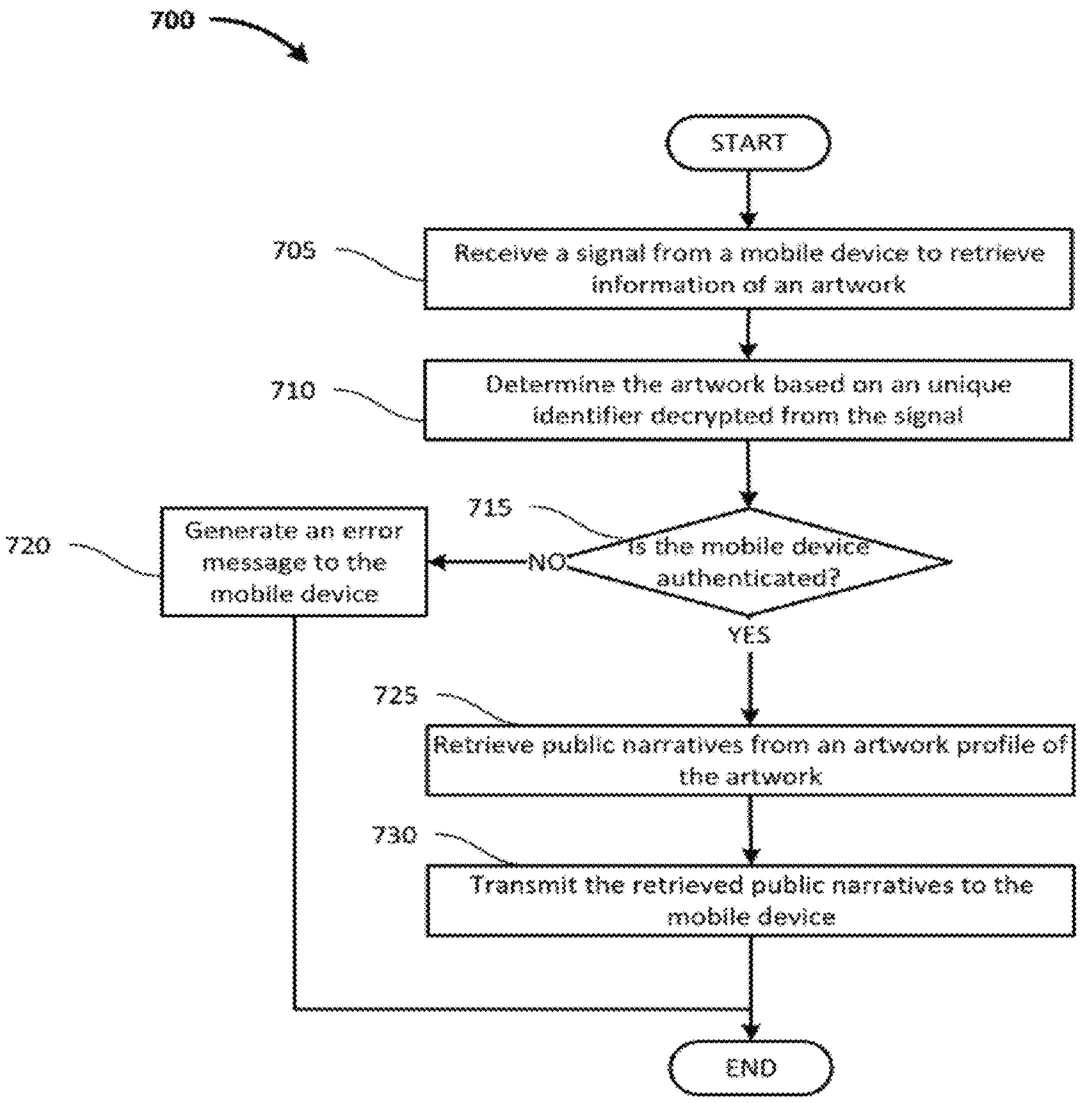
FIG. 7 is a flowchart illustrating an exemplary ACC access method.

FIG. 7 is a flowchart illustrating an exemplary ACC access method. The method 700 begins when a signal from a mobile device to retrieve information of an artwork is received in step 705. For example, the mobile device 130 may scan an RFID of the ACC 110. For example, scanning the RFID may generate a signal to be transmitted to the ATLAS 140. Next, the artwork is determined based on a unique identifier decrypted from the signal in step 710. For example, the ATLAS 140 may use the APDB 165 to identify an artwork related to the unique identifier stored in the first NFC tag 210 attached to the painting artwork 205.

In a decision point 715, it is determined whether the mobile device is authenticated. For example, the ACC 110 may request a username and password credentials from the mobile device. For example, the ACC 110 may compare a device identification number (e.g., an IMEI number of the mobile device) to a "whitelist" of authorized device identification numbers. If the mobile device is not authenticated, in step 720, an error message is generated to the mobile device, and the method 700 ends. In some implementations, the decision point 715 may be optional. For example, the ATLAS 140 may provide the public tag narratives 235 to any mobile device upon identifying the artwork corresponding to the received signal.

If the mobile device is authenticated, in step 725, public narratives are retrieved from an artwork profile of the artwork. For example, the ATLAS 140 may retrieve the public tag narratives 235 of the painting artwork 205 based on the APDB 165. In step 730, the retrieved public narratives are transmitted to the mobile device, and the method 700 ends. For example, the public tag narratives 235 may be displayed on the user interface 230.

Figure 8:
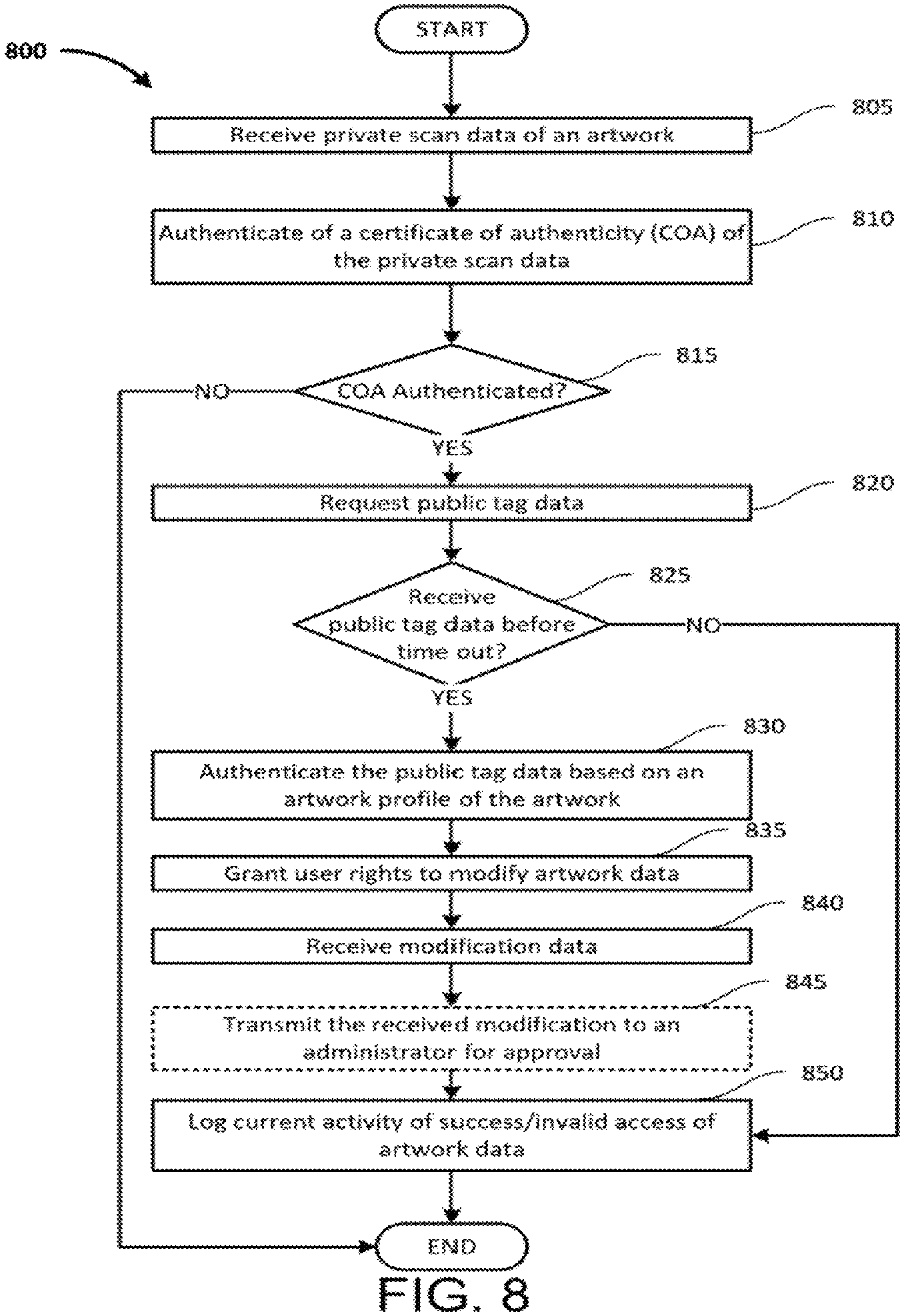
FIG. 8 is a flowchart illustrating an exemplary private tag data processing method.

FIG. 8 is a flowchart illustrating an exemplary private tag data processing method. For example, the exemplary double NFC tags data processing method 800 may be performed by the ATLAS 140. In this example, the exemplary double NFC tags data processing method 800 begins in step 805 when a private scan data of an artwork is received. For example, the communication module 125 may receive scan data of the second NFC tag 215 by the mobile device 130. For example, an owner (e.g., or other user in the authorized key holder 365) of the artwork 105 may scan the second NFC tag 215 from the COA 185. For example, the private scan data may include a private unique identifier stored in the second NFC tag 215.

In step 810, a certificate of authenticity of the private scan data is authenticated. For example, the COA 185 may be authenticated as a function of the private unique identifier and user input. For example, the ATLAS 140 may decrypt the private scan data to determine a unique ID of the COA 185. For example, the user may provide a login name and password. For example, the user may provide biometric identification that is matched with a user account associated with the private scan data. Based on the received information, the ATLAS 140 may validate the private scan data based on information in the APDB 165 and/or the UPDB 160, for example.

In a decision point 815, it is determined whether the COA is authenticated. For example, the user management engine 285 may authenticate the COA against the user's credential. For example, the AE 340 may authenticate a credential received from the mobile device 130. If the user is not authenticated to access the private data of the artwork, the method 800 ends. If the user is authenticated, in step 820, public tag data is requested. For example, the communication module 125 may generate at a user interface of the computing device 220 for the public tag data by scanning the first NFC tag 210. In some implementations, the ATLAS 140 may request the user to scan the (private) second NFC tag 215 again upon successful authentication. Then, for example, the ATLAS 140 may subsequently request the public tag data after receiving a scan data from the second NFC tag 215 for a second time.

In a decision point 825, it is determined whether the public tag data is received before time out. For example, the predetermined time out period may be 30 seconds. For example, the predetermined time out period may be 1 minute. For example, the user may transmit the public tag data by scanning the first NFC tag 210 of the painting artwork 205. If the public tag data is received before time out, in step 830, the public tag data is authenticated based on an artwork profile of the artwork. For example, the AE 340 may authenticate the public tag data by decrypting a unique identifier of the first NFC tag 210. For example, the unique identifier may be validated against an artwork associated with the unique identifier, the COA 185 corresponding to the unique identifier, and the user credentials related to the artwork. For example, the AE 340 may retrieve the authentication information from the artwork profile 350.

In step 835, access rights are granted to modify artwork data. For example, the user may be granted the right to transmit new artwork data to the ATLAS 140. Next, modification is received in step 840. For example, the artwork management engine 245 may be used to modify artwork data.

In an optional step 845, after receiving user modifications, the received modification may be transmitted to an administrator for approval. For example, the write engine 270 may be configured to request additional confirmation when a modification in ownership is received. If there is a time out in the decision point 825, or after the optional step 845, current activity of success or invalid access of the artwork data is logged in step 850, and the exemplary double NFC tags data processing method 800 ends. For example, the log may be stored in the scan logs 265.

Figure 9A:
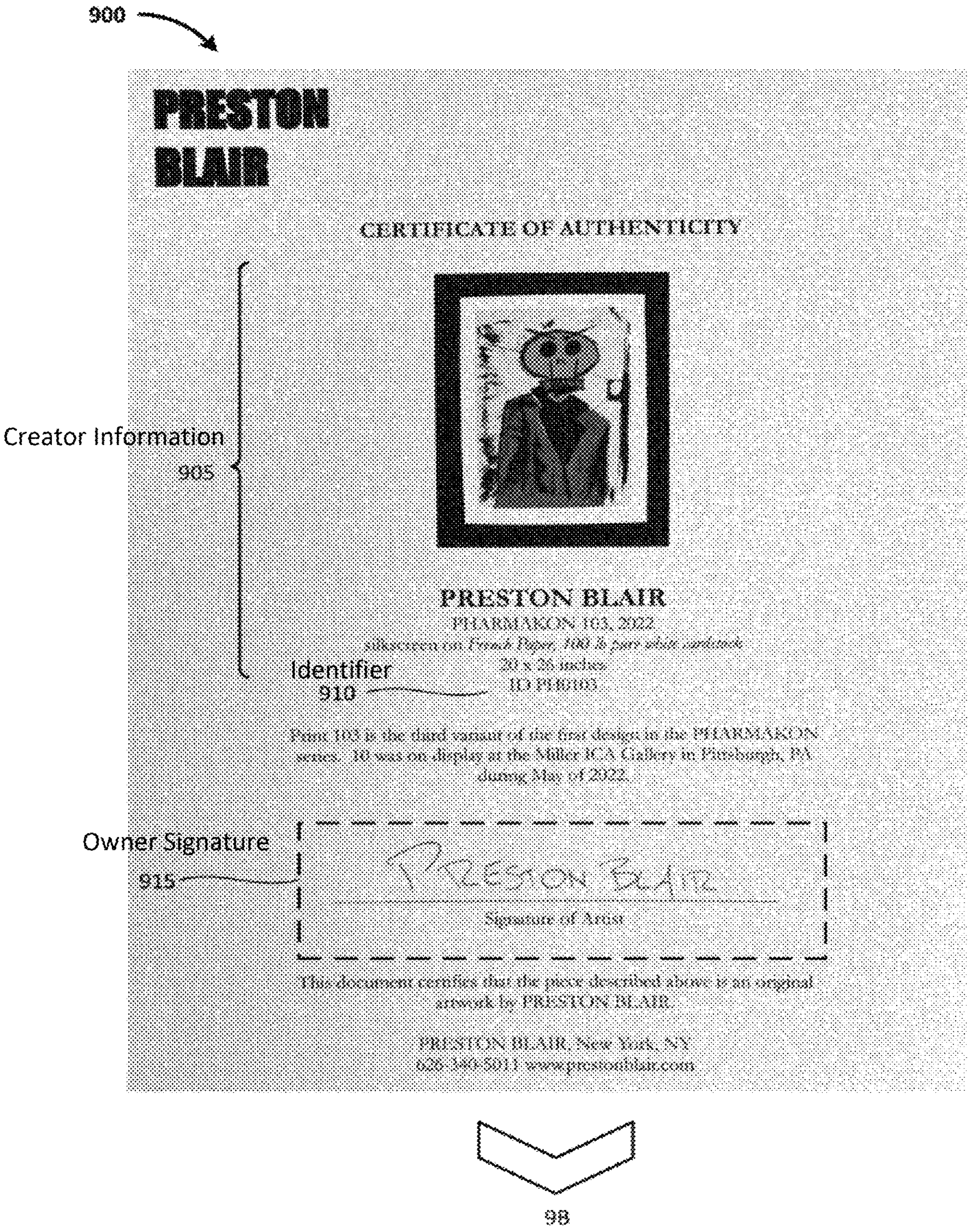
Figure 9C:
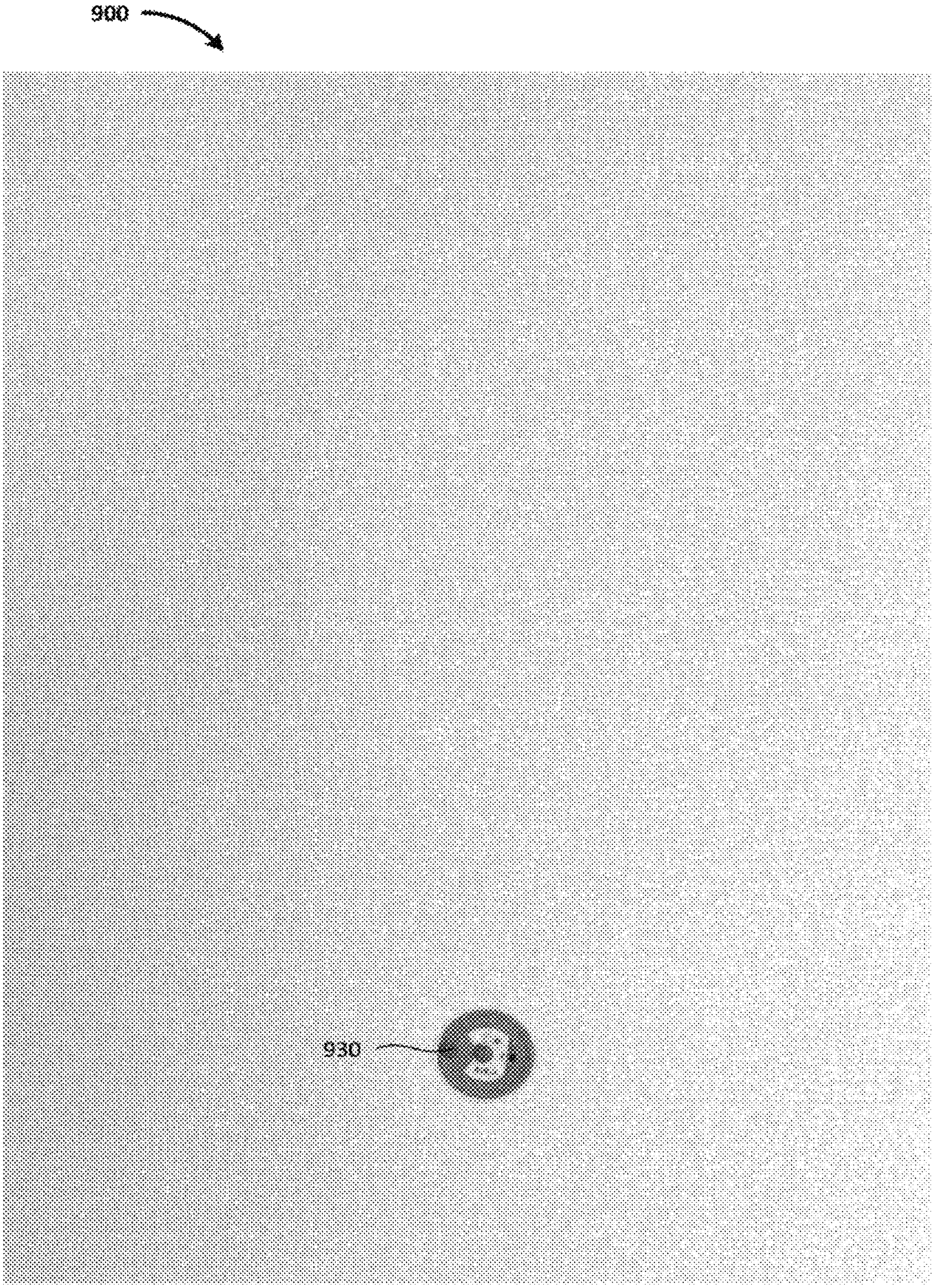

FIG. 9A, FIG. 9B, and FIG. 9C depict an exemplary embodiment of an exemplary certificate of authenticity. In this example, a COA 900 may include a creator information 905, an identifier 910, and an owner signature 915 as shown in FIGS. 9A-B. In some implementations, the COA 900 may include (e.g., be embedded with) a private tag (e.g., the second NFC tag 215). In this example, a private tag 930 may be embedded behind the owner signature 915 as shown in a back view of the COA 900 depicted in FIG. 9C. As shown, when a user is scanning the owner signature 915 with a mobile device 920, the ATLAS 140 may generate a "sign in" user interface (SIUI) to request user credentials. For example, the ATLAS 140 may authenticate an access to private tag data based on user input at the SIUI.

Figure 10A:
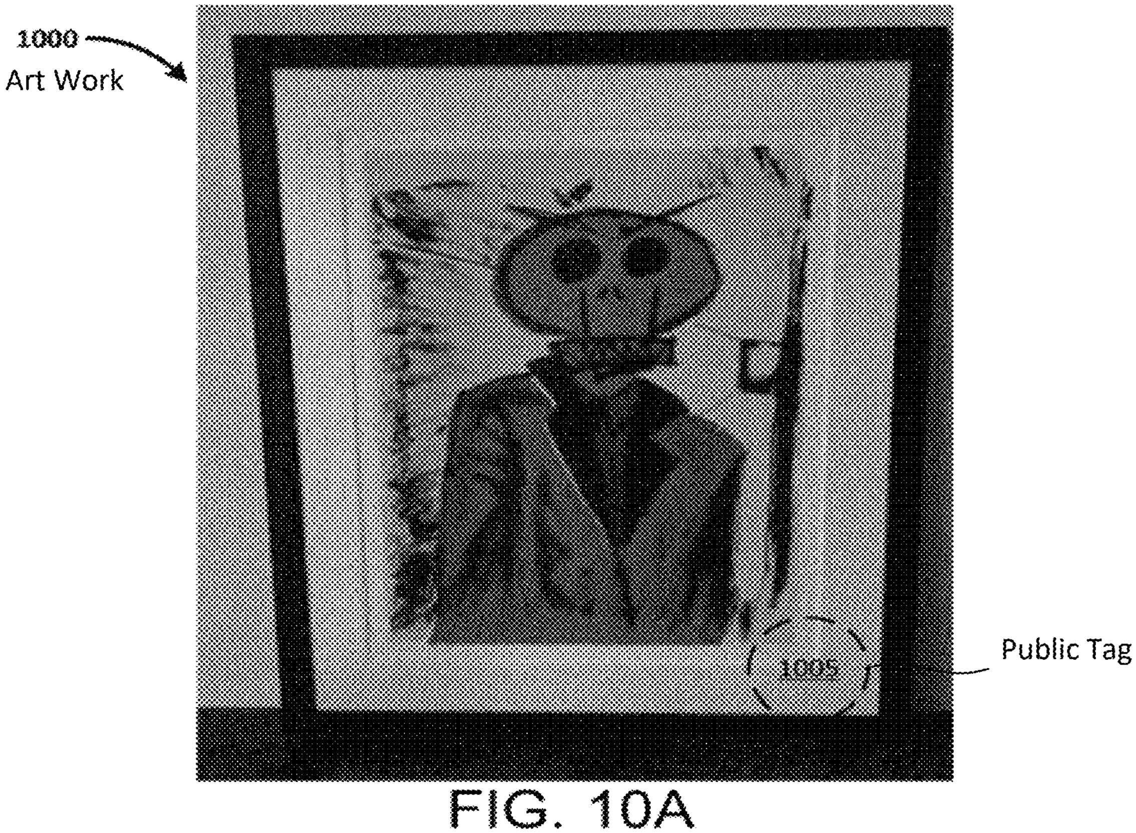
FIG. 10A, FIG. 10B, and FIG. 10C depict an exemplary public tag embedded in an artwork.
Figure 10B:
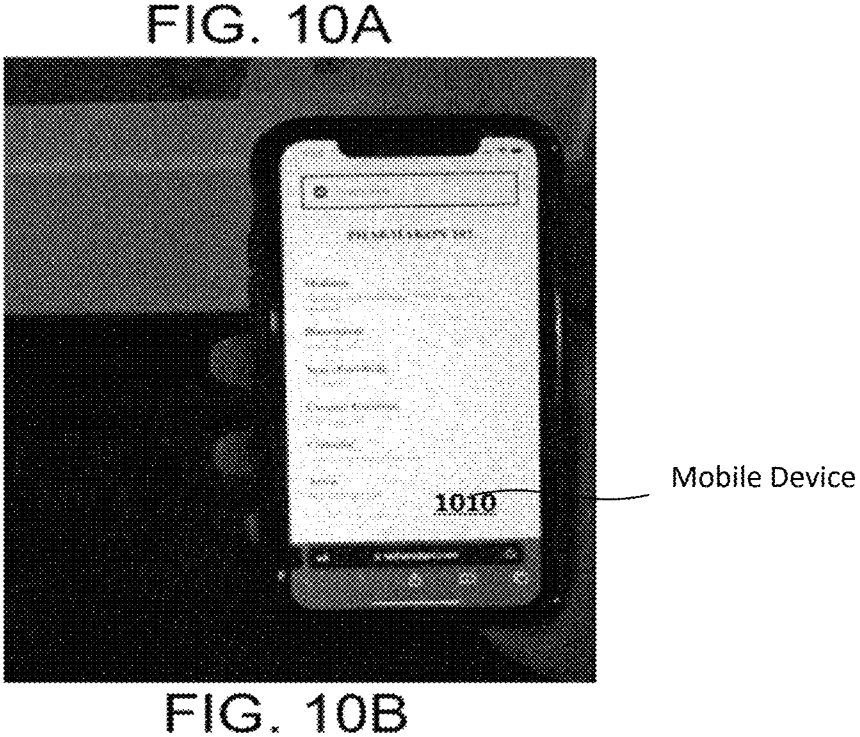
Figure 10C:
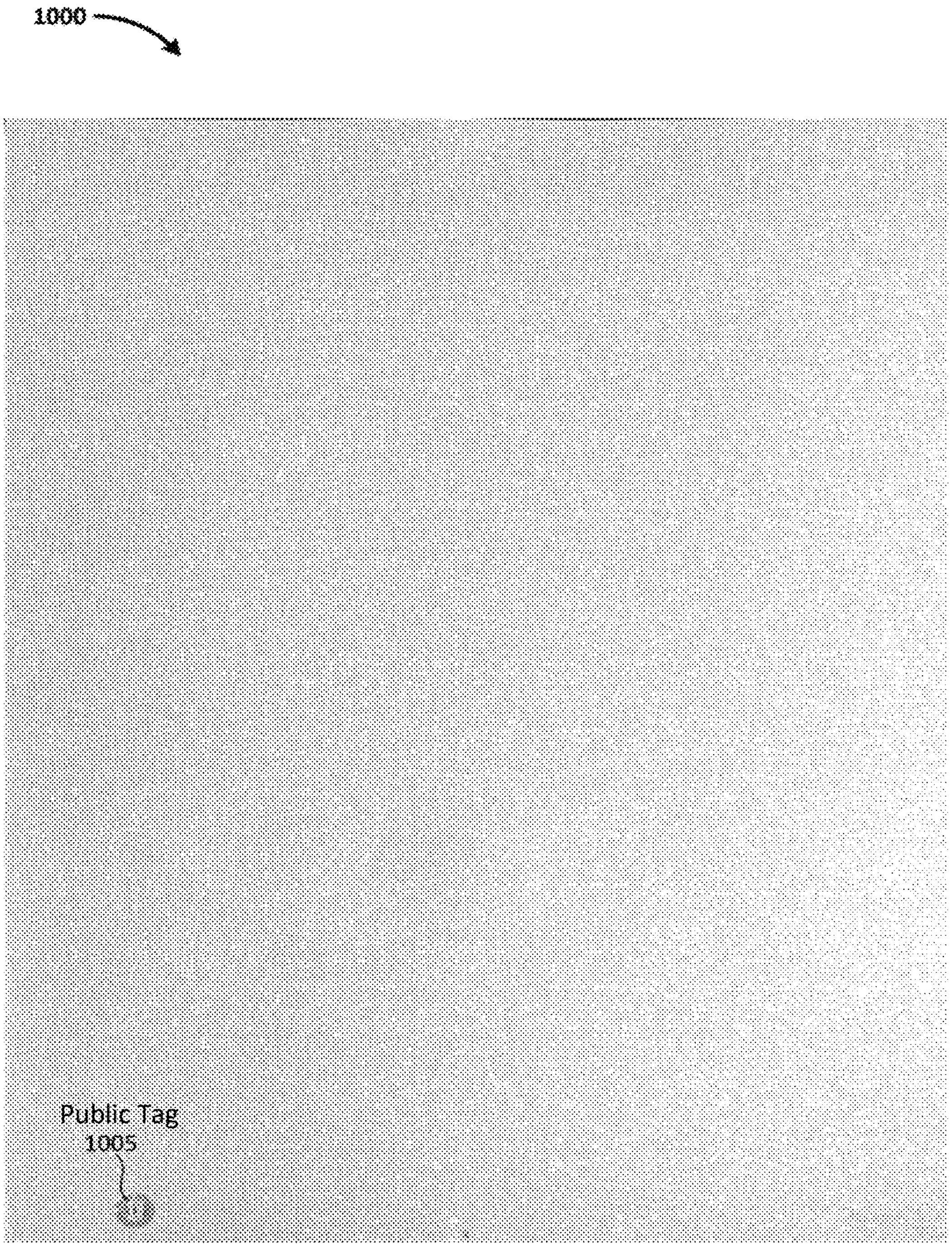

FIG. 10A, FIG. 10B, and FIG. 10C depict an exemplary public tag embedded in an artwork. As shown in FIG. 10A, an artwork 1000 may correspond to the COA 900 as described in FIGS. 9A-C. For example, an artist may create the COA 185 by registering the artwork 1000 in the ATLAS 140. A public tag 1005 is attached to the artwork 1000. FIG. 10C shows a back of the artwork 1000. As shown in FIG. 10C, the public tag 1005 may be attached at a back of the artwork 1000. For example, the public tag 1005 may be an RFID. In some implementations, the public tag 1005 may be linked to the COA 185 when the artwork 1000 is registered in the ATLAS 140.

As shown in FIG. 10B, when the public tag 1005 is scanned by a mobile device 1010, the ATLAS 140 may generate a public narrative of the artwork 1000. For example, the public narrative may be retrieved from an artwork profile of the artwork 1000.

Although various embodiments have been described with reference to the figures, other embodiments are possible. For example, the artwork profile 350 may be updated such that an artist entity is a trust instead of a person. For example, after an artist dies, his/her account may be passed to a trustee account (e.g., a family account, a donation account).

In some implementations, the ACC 110 may be authenticated periodically by an authenticated third party. For example, the authenticated third party may be a reputable organization local to the artwork 105. For example, the authenticated third party may be a reputable gallery. For example, the authenticated third party may be a museum. In some examples, the ACC 110 may be accessed by a monitoring device of the authenticated third party when the ACC 110 is not capable of transmitting the location information by itself.

Although an exemplary system has been described with reference to FIGS. 1-2B, other implementations may be deployed in other industrial, scientific, medical, commercial, and/or residential applications. For example, the ARIS 100 may be applicable to authenticate transfer and movement of other assets including artwork. For example, the ACC 110 may be attached to a valuable piece of furniture such that a movement of the furniture out of a predetermined geofence may trigger an event at the ATAPM 170.

In some implementations, the COA 185 may be a digital certificate. For example, a virtual COA may include a unique identifier. For example, a user (e.g., the artist 150) may register the virtual COA with the public ID 380 attached to an artwork in the ARIS 100.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as 9V (nominal) batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device. The display device may, for example, include an LED (light-emitting diode) display. In some implementations, a display device may, for example, include a CRT (cathode ray tube). In some implementations, a display device may include, for example, an LCD (liquid crystal display). A display device (e.g., monitor) may, for example, be used for displaying information to the user. Some implementations may, for example, include a keyboard and/or pointing device (e.g., mouse, trackpad, trackball, joystick), such as by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, an artwork validation system may include a public tag (110) physically attached to an asset (105) may include a first unique identifier (210) associated with the asset. For example, the artwork validation system may include a certificate of authenticity (185) may include a second unique identifier (215). For example, the artwork validation system may include a centralized server (140) that may include a communication module (125) configured to transmit and receive data via a communication network (145).

For example, the centralized server may include a data store (315, 325) that may include a program of instructions and an asset profile (350) may include an ownership information and registered association between the first unique identifier and the second unique identifier. For example, the centralized server may include a processor (305) operably coupled to the data store such that, when the processor executes the program of instructions, the processor causes operations to be performed to automatically authenticate an ownership of the asset attached to the public tag. For example, the operations may include receive, from a user device, a private scan data from the certificate of authenticity via the communication module (805). For example, the private scan data may include a private unique identifier. For example, the operations may include authenticate of the certificate of authenticity using an authentication engine as a function of the private unique identifier (810) and user input.

For example, the operations may include, after the certificate of authenticity may be authenticated, generate a request signal to the user device to request a public scan data (820) For example, the operations may include receive, by scanning the public tag, a public scan data from the users device within a predetermined time period via the communication network (825). For example, the operations may include authenticate the public tag as a function of a public unique identifier of the received public scan data and the asset profile (830).

For example, based on the uniquely registered association, if the public unique identifier may be associated with the private unique identifier, generate a signal granting modification rights to the user device to the asset profile (835), such that a modification to the ownership information of the asset may be generated only when the centralized authentication server validates the certificate of authenticity and the public tag within the predetermined time period.

For example, the public tag further may include a position sensor configured to transmit a location of the asset to the central authentication server, and a gyroscope configured to activate the position sensor upon detection of movement. For example, upon receiving the location of the asset, the central authentication server may be configured to determine whether the location may be within a predetermined geofence, and generate a signal to block future modifications of the asset profile if the location may be out of the predetermined geofence, such that potential theft of the asset may be prevented.

For example, the position sensor may include a GPS tracker device. For example, the public tag may include a RFID chip.

For example, the second unique identifier may be stored in a cryptographic format in that certificate of authenticity, such that the unique identifier may be revealed only upon decryption using a private key received from the user device.

For example, the operations may include, upon receiving a modification to the ownership information of the asset, generate an authorization request signal to a current owner's device to complete the modification.

For example, the asset profile may include a ledger data may include transaction history of the asset. For example, after a transfer of ownership of the asset may be completed, the operations further may include generating new entries at the ledger data based on a set of predetermined compensation rules associated with selected entities may include historical owners of the asset, galleries associated with the asset, and a creator of the asset.

For example, the asset profile further may include a public narrative customizable by an authenticated user associated with the asset. For example, when the public scan data may be received from a mobile device before any private scan data may be received from the mobile device, the processor may be configured to perform public narrative operations may include determine an asset associated with the public scan data based on a unique identifier decrypted from the public scan data. For example, the public narrative operations may include generate a display may include the public narratives associated with the asset at the mobile device.

In an illustrative aspect, a computer-implemented method performed by at least one processor to automatically authenticate an ownership of an asset attached to a public data chip (110). For example, the method may include receive, from a user device, a private scan data of a certificate of authenticity of a private data chip (805). For example, the private scan data may include a private unique identifier (215).

For example, the method may include authenticate of the certificate of authenticity using an authentication engine as a function of the private unique identifier and user input (810). For example, the method may include, after the certificate of authenticity may be authenticated, generate a request signal to the user device to request a public scan data (820).

For example, the method may include receive, from the user device, a public scan data by operating a public tag fixedly attached to a tangible asset within a predetermined time period (825). For example, the method may include retrieve a uniquely registered association between the private unique identifier and an associated unique identifier (830). For example, the method may include, if the associated unique identifier may be equal to a unique identifier (210) of the received public scan data (835), authenticate the public tag and generate a signal granting modification rights to the user device to an asset profile (350). For example, the asset profile may include an ownership information (385) of the tangible asset, such that a modification to the ownership information of the asset may be generated only when both the certificate of authenticity and the public tag may be validated within the predetermined time period.

For example, the methods may include receiving a location signal of the public tag. For example, the location signal may be activated upon detection of movement. For example, the methods may include determine whether the location may be within a predetermined geofence. For example, the methods may include, generate a signal to block future modifications of the asset profile if the location may be out of the predetermined geofence, such that potential theft of the asset may be prevented.

For example, the public tag may include a RFID chip.

For example, the private unique identifier may be stored in a cryptographic format in that certificate of authenticity, such that the unique identifier may be revealed only upon decryption using a private key received from the user device.

For example, the methods may include, upon receiving a modification to the ownership information of the asset, generate an authorization request signal to a current owner's device to complete the modification.

For example, the asset profile further may include a public narrative customizable by an authenticated user associated with the tangible asset. For example, the method further may include, upon receiving the public scan data from a mobile device before any private scan data may be received, determine an asset associated with the public scan data based on a unique identifier decrypted from the public scan data. For example, the methods may include generate a display may include the public narratives associated with the asset at the mobile device.

In an illustrative aspect, a computer program product may include a program of instructions tangibly embodied on a non-transitory computer readable medium. For example, when the instructions may be executed on a processor, the processor causes authentication operations to be performed to automatically authenticate an ownership of an asset attached to a public data chip. For example, the operations may include receive, from a user device, a private scan data of a certificate of authenticity of a private data chip (805). For example, the private scan data may include a private unique identifier (215). For example, the operations may include authenticate of the certificate of authenticity using an authentication engine as a function of the private unique identifier (810) and user input.

For example, the operations may include, after the certificate of authenticity may be authenticated, generate a request signal to the user device to request a public scan data (820). For example, the operations may include receive, from the user device, a public scan data by operating a public tag fixedly attached to a tangible asset within a predetermined time period (825). For example, the operations may include retrieve a uniquely registered association between the private unique identifier and an associated unique identifier (830). For example, the operations may include, if the associated unique identifier may be equal to a unique identifier (210) of the received public scan data, authenticate the public tag and generate a signal granting modification rights to the user device to an asset profile (835). For example, the asset profile may include an ownership information of the tangible asset, such that a modification to the ownership information (385) of the asset may be generated only when both the certificate of authenticity and the public tag may be validated within the predetermined time period.

For example, the operations may include receiving a location signal of the public tag. For example, the location signal may be activated upon detection of movement. For example, the operations may include determine whether the location may be within a predetermined geofence. For example, the operations may include generate a signal to block future modifications of the asset profile if the location may be out of the predetermined geofence, such that potential theft of the asset may be prevented.

For example, the public tag may include a RFID chip.

For example, the private unique identifier may be stored in a cryptographic format in that certificate of authenticity, such that the unique identifier may be revealed only upon decryption using a private key received from the user device.

For example, the operations may include upon receiving a modification to the ownership information of the asset, generate an authorization request signal to a current owner's device to complete the modification.

For example, the asset profile further may include a public narrative customizable by an authenticated user associated with the tangible asset. For example, the operations further may include, upon receiving the public scan data from a mobile device before any private scan data may be received, determine an asset associated with the public scan data based on a unique identifier decrypted from the public scan data. For example, the operations may include generate a display may include the public narratives associated with the asset at the mobile device.

In an illustrative example, an artwork transfer validation system may include an artwork companion chip (110) physically attached to an artwork (105). For example, the artwork companion chip may include an artwork identifier (135) uniquely identifying and associated with the artwork. For example, the artwork companion chip may include a position sensor (115) configured to transmit a location data of the artwork. For example, the artwork companion chip may include a gyroscope (120) configured to activate the position sensor upon detection of movement.

For example, the artwork transfer validation system may include a centralized server (140). The centralized server may include a communication module (125) configured to receive the location data via a communication network (145) from the artwork companion chip. For example, the centralized server may include a data store (315, 325) that may include a program of instructions and an artwork profile (165). For example, the artwork profile may include a predetermined geofence associated with the artwork.

For example, the centralized server may include a processor (305) operably coupled to the data store such that, when the processor executes the program of instructions, the processor causes operations to be performed to automatically authenticate a movement of the artwork. For example, the operations may include, upon receiving the location of the artwork, determine whether the location may be within the predetermined geofence.

For example, the operations may include generate a signal to block future modifications of the artwork profile if the location may be out of the predetermined geofence, such that potential theft of the artwork may be prevented.

For example, the artwork validation system of any of [0108-117] may be combined with any of the computer-implemented method of any of [0118-125]. For example, the artwork validation system of any of [0108-117] may be combined with any of the computer program product of any of [0126-132]. For example, the artwork validation system of any of [0108-117] may be combined with any of the artwork transfer validation system of any of [0133-136].

For example, the computer-implemented method of any of [0118-125] may be combined with any of the artwork validation system of any of [0108-117]. For example, the computer-implemented method of any of [0118-125] may be combined with any of the computer program product of any of [0126-132]. For example, the computer-implemented method of any of [0118-125] may be combined with any of the artwork transfer validation system of any of [0133-136].

For example, the computer program product of any of [0126-132] may be combined with any of the computer-implemented method of any of [0118-125]. For example, the computer program product of any of [0126-132] may be combined with any of the artwork validation system of any of [0108-117]. For example, the computer program product of any of [0126-132] may be combined with any of the artwork transfer validation system of any of [0133-136].

For example, the artwork transfer validation system of any of [0133-136] may be combined with any of the computer-implemented method of any of [0118-125]. For example, the artwork transfer validation system of any of [0133-136] may be combined with any of the artwork validation system of any of [0108-117]. For example, the artwork transfer validation system of any of [0133-136] may be combined with any of the artwork validation system of any of [0108-117].

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An artwork validation system comprising:

a public tag physically attached to a tangible asset comprising a first unique identifier associated with the tangible asset;

a certificate of authenticity comprises a second unique identifier; and, a centralized server comprises:

- a communication module configured to transmit and receive data via a communication network;
- a data store comprising a program of instructions and an asset profile comprises an ownership information and registered association between the first unique identifier and the second unique identifier; and,
- a processor operably coupled to the data store such that, when the processor executes the program of instructions, the processor causes operations to be performed to automatically authenticate an ownership of the tangible asset attached to the public tag, the operations comprising:
  - receive, from a user device, a private scan data from the certificate of authenticity via the communication module, wherein the private scan data comprises a private unique identifier:

authenticate of the certificate of authenticity using an authentication engine as a function of the private unique identifier and user input;

after the certificate of authenticity is authenticated, generate a request signal to the user device to request a public scan data;

receive, by scanning the public tag, a public scan data from the user device within a predetermined time period comprising a period of less than one hour, via the communication network; and, authenticate the public tag as a function of a public unique identifier of the received public scan data and the asset profile;

if, based on the uniquely registered association, the public unique identifier is associated with the private unique identifier, generate a signal granting modification rights to the user device to the asset profile, such that a modification to the ownership information of the tangible asset is generated only when the centralized server validates the certificate of authenticity and the public tag within the predetermined time period.

2. The artwork validation system of claim 1, wherein the public tag further comprises a position sensor configured to transmit a location of the tangible asset to the central authentication server, and a gyroscope configured to activate the position sensor upon detection of movement, wherein:

upon receiving the location of the tangible asset, the central authentication server is configured to determine whether the location is within a predetermined geofence, and generate a signal to block future modifications of the asset profile if the location is out of the predetermined geofence, such that potential theft of the tangible asset is prevented.

3. The artwork validation system of claim 2, wherein the position sensor comprises a GPS tracker device.

4. The artwork validation system of claim 1, wherein the public tag comprises a wirelessly communicable data chip.

5. The artwork validation system of claim 1, wherein the second unique identifier is stored in a cryptographic format in that certificate of authenticity, such that the unique identifier is revealed only upon decryption using a private key received from the user device.

6. The artwork validation system of claim 1, wherein the operations comprise:

upon receiving a modification to the ownership information of the tangible asset, generate an authorization request signal to a current owner's device to complete the modification.

7. The artwork validation system of claim 1, wherein the asset profile further comprises a ledger data comprising transaction history of the tangible asset, wherein, after a transfer of ownership of the tangible asset is completed, the operations further comprises generating new entries at the ledger data based on a set of predetermined compensation rules associated with selected entities comprise historical owners of the tangible asset, galleries associated with the tangible asset, and a creator of the tangible asset.

8. The artwork validation system of claim 1, wherein the asset profile further comprises a public narrative customizable by an authenticated user associated with the tangible asset, wherein:

when the public scan data is received from a mobile device before any private scan data is received from the mobile device, the processor is configured to perform public narrative operations comprise:

determine a tangible asset associated with the public scan data based on a unique identifier decrypted from the public scan data, and, generate a display comprising the public narratives associated with the tangible asset at the mobile device.

9. A computer-implemented method performed by at least one processor to automatically authenticate an ownership of a tangible asset attached to a public data chip the method comprising:

receive, from a user device, a private scan data of a certificate of authenticity of a private data chip, wherein the private scan data comprises a private unique identifier;

authenticate of the certificate of authenticity using an authentication engine as a function of the private unique identifier and user input;

after the certificate of authenticity is authenticated, generate a request signal to the user device to request a public scan data;

receive, from the user device, a public scan data by operating a public tag fixedly attached to the tangible asset within a predetermined time period comprising a period of less than one hour;

retrieve a uniquely registered association between the private unique identifier and an associated unique identifier; and, if the associated unique identifier is equal to a unique identifier of the received public scan data, authenticate the public tag and generate a signal granting modification rights to the user device to an asset profile comprising an ownership information of the tangible asset, such that a modification to the ownership information of the tangible asset is generated only when both the certificate of authenticity and the public tag are validated within the predetermined time period.

10. The computer-implemented method of claim 9, further comprises:

receiving a location signal of the public tag, wherein the location signal is activated upon detection of movement; and, determine whether the location is within a predetermined geofence; and, generate a signal to block future modifications of the asset profile if the location is out of the predetermined geofence, such that potential theft of the tangible asset is prevented.

11. The computer-implemented method of claim 9, wherein the public tag comprises a wirelessly communicable data chip.

12. The computer-implemented method of claim 9, wherein the private unique identifier is stored in a cryptographic format in that certificate of authenticity, such that the unique identifier is revealed only upon decryption using a private key received from the user device.

13. The computer-implemented method of claim 9, further comprising, upon receiving a modification to the ownership information of the tangible asset, generate an authorization request signal to a current owner's device to complete the modification.

14. The computer-implemented method of claim 9, wherein the asset profile further comprises a public narrative customizable by an authenticated user associated with the tangible asset, wherein the method further comprises:

upon receiving the public scan data from a mobile device before any private scan data is received, determine a tangible asset associated with the public scan data based on a unique identifier decrypted from the public scan data, and, generate a display comprising the public narratives associated with the tangible asset at the mobile device.

15. A computer program product comprising a program of instructions tangibly embodied on a non-transitory computer readable medium wherein, when the instructions are executed on a processor, the processor causes authentication operations to be performed to automatically authenticate an ownership of a tangible asset attached to a public data chip, the operations comprising:

receive, from a user device, a private scan data of a certificate of authenticity of a private data chip, wherein the private scan data comprises a private unique identifier;

authenticate of the certificate of authenticity using an authentication engine as a function of the private unique identifier and user input;

after the certificate of authenticity is authenticated, generate a request signal to the user device to request a public scan data;

receive, from the user device, a public scan data by operating a public tag fixedly attached to a tangible asset within a predetermined time period comprising a period of less than one hour;

retrieve a uniquely registered association between the private unique identifier and an associated unique identifier; and, if the associated unique identifier is equal to a unique identifier of the received public scan data, authenticate the public tag and generate a signal granting modification rights to the user device to an asset profile comprising an ownership information of the tangible asset, such that a modification to the ownership information of the tangible asset is generated only when both the certificate of authenticity and the public tag are validated within the predetermined time period.

16. The computer program product of claim 15, further comprises:

receiving a location signal of the public tag, wherein the location signal is activated upon detection of movement; and, determine whether the location is within a predetermined geofence; and, generate a signal to block future modifications of the asset profile if the location is out of the predetermined geofence, such that potential theft of the tangible asset is prevented.

17. The computer program product of claim 15, wherein the public tag comprises a wirelessly communicable data chip.

18. The computer program product of claim 15, wherein the private unique identifier is stored in a cryptographic format in that certificate of authenticity, such that the unique identifier is revealed only upon decryption using a private key received from the user device.

19. The computer program product of claim 15, further comprising, upon receiving a modification to the ownership information of the tangible asset, generate an authorization request signal to a current owner's device to complete the modification.

20. The computer program product of claim 15, wherein the asset profile further comprises a public narrative customizable by an authenticated user associated with the tangible asset, wherein the operations further comprise:

upon receiving the public scan data from a mobile device before any private scan data is received, determine a tangible asset associated with the public scan data based on a unique identifier decrypted from the public scan data, and, generate a display comprising the public narratives associated with the tangible asset at the mobile device.

21. The artwork validation system of claim 1, wherein the operations further comprise:

in response to a generated modification to the ownership information, receive modification data comprising an updated ownership of the tangible asset and store within the asset profile in the data store the modification data.

* * * * *